United States Patent
Lee et al.

(10) Patent No.: US 10,269,344 B2
(45) Date of Patent: Apr. 23, 2019

(54) SMART HOME APPLIANCES, OPERATING METHOD OF THEREOF, AND VOICE RECOGNITION SYSTEM USING THE SMART HOME APPLIANCES

(71) Applicant: LG ELECTRONICS INC., Seoul (KR)

(72) Inventors: Juwan Lee, Seoul (KR); Lagyoung Kim, Seoul (KR); Taedong Shin, Seoul (KR); Daegeun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 198 days.

(21) Appl. No.: 15/103,528

(22) PCT Filed: Nov. 4, 2014

(86) PCT No.: PCT/KR2014/010536
§ 371 (c)(1),
(2) Date: Jun. 10, 2016

(87) PCT Pub. No.: WO2015/088141
PCT Pub. Date: Jun. 18, 2015

(65) Prior Publication Data
US 2017/0004828 A1   Jan. 5, 2017

(30) Foreign Application Priority Data

Dec. 11, 2013   (KR) .................. 10-2013-0153713

(51) Int. Cl.
*G06F 3/01* (2006.01)
*G06F 3/16* (2006.01)
(Continued)

(52) U.S. Cl.
CPC .............. *G10L 15/22* (2013.01); *G06F 3/012* (2013.01); *G06F 3/167* (2013.01);
(Continued)

(58) Field of Classification Search
CPC ......... G10L 15/24; G10L 15/25; G10L 15/22; G10L 2015/226; G10L 13/033
See application file for complete search history.

(56) References Cited

U.S. PATENT DOCUMENTS 5,226,090 A * 7/1993 Kimura ................... H04B 1/46
                                                    348/734
5,357,596 A * 10/1994 Takebayashi ............. G06F 3/16
                                                    704/251
(Continued)

FOREIGN PATENT DOCUMENTS

CN         1423228 A      6/2003
CN       101808047 A      8/2010
(Continued)

OTHER PUBLICATIONS

G. Julian Lepinski et al., "Using Eye Contact and Contextual Speech Recognition for Hands-Free Surgical Charting", Pervasive Computing Technologies for Healthcare, 2008, Pervasivehealth 2008, Second International Conference, IEEE, Piscataway, NJ, USA, Jan. 30, 2008, pp. 119-120, XP031289749.
(Continued)

*Primary Examiner* — Eric Yen
(74) *Attorney, Agent, or Firm* — Dentons US LLP

(57) ABSTRACT

Provided is a smart home appliance. The smart home appliance includes: a voice input unit collecting a voice; a voice recognition unit recognizing a text corresponding to the voice collected through the voice input unit; a capturing unit collecting an image for detecting a user's visage or face; a memory unit mapping the text recognized by the voice recognition unit and a setting function and storing the mapped information; and a control unit determining whether to perform a voice recognition service on the basis of at least one information of image information collected by the
(Continued)

capturing unit and voice information collected by the voice input unit.

23 Claims, 18 Drawing Sheets

(51) Int. Cl.

| | | |
|---|---|---|
| *G06K 9/00* | (2006.01) | |
| *G10L 15/08* | (2006.01) | |
| *G10L 15/22* | (2006.01) | |
| *G10L 15/24* | (2013.01) | |
| *G10L 15/25* | (2013.01) | |
| *G10L 15/26* | (2006.01) | |
| *G10L 17/24* | (2013.01) | |
| *G10L 25/63* | (2013.01) | |
| *G10L 25/84* | (2013.01) | |
| *H04L 12/28* | (2006.01) | |
| *G10L 13/027* | (2013.01) | |
| *G10L 13/033* | (2013.01) | |
| *G10L 21/0208* | (2013.01) | |

(52) U.S. Cl.
CPC ..... *G06K 9/00228* (2013.01); *G06K 9/00302* (2013.01); *G10L 13/033* (2013.01); *G10L 15/08* (2013.01); *G10L 15/25* (2013.01); *G10L 17/24* (2013.01); *G10L 21/0208* (2013.01); *G10L 25/63* (2013.01); *G10L 25/84* (2013.01); *H04L 12/2803* (2013.01); *G10L 13/027* (2013.01); *G10L 15/24* (2013.01); *G10L 15/26* (2013.01); *G10L 2015/088* (2013.01); *G10L 2015/223* (2013.01); *G10L 2015/226* (2013.01); *G10L 2015/227* (2013.01)

(56) References Cited

U.S. PATENT DOCUMENTS

| | | | | |
|---|---|---|---|---|
| 5,983,186 A * | 11/1999 | Miyazawa | ............... | G10L 15/26 704/233 |
| 6,243,675 B1 | 6/2001 | Ito | | |
| 6,359,270 B1 * | 3/2002 | Bridson | ............... | G06Q 10/107 219/679 |
| 6,721,706 B1 * | 4/2004 | Strubbe | ................... | G10L 15/18 704/257 |
| 6,999,932 B1 | 2/2006 | Zhou | | |
| 7,801,730 B1 * | 9/2010 | Miyazaki | ................. | G10L 15/26 704/275 |
| 8,417,530 B1 * | 4/2013 | Hayes | ............... | G06F 17/30026 704/1 |
| 8,571,851 B1 * | 10/2013 | Tickner | ............... | G06F 17/2785 704/1 |
| 9,401,140 B1 * | 7/2016 | Weber | ..................... | G10L 15/00 |
| 9,443,527 B1 * | 9/2016 | Watanabe | ............... | G10L 15/22 |
| 2002/0114519 A1 | 8/2002 | Mastrianni et al. | | |
| 2002/0161647 A1 * | 10/2002 | Gailey | ............. | G06F 17/30867 705/14.23 |
| 2004/0054534 A1 * | 3/2004 | Junqua | .................. | G10L 13/033 704/258 |
| 2004/0059580 A1 * | 3/2004 | Michelson | ............. | G06Q 10/06 704/270.1 |
| 2004/0176953 A1 * | 9/2004 | Coyle | .................... | G10L 15/22 704/253 |
| 2005/0182631 A1 * | 8/2005 | Lee | ......... | G10L 15/22 704/275 |
| 2006/0004743 A1 * | 1/2006 | Murao | ............... | H04N 7/17318 |
| 2006/0192775 A1 * | 8/2006 | Nicholson | ................ | A61F 4/00 345/211 |
| 2006/0252457 A1 | 11/2006 | Schrager | | |
| 2007/0005570 A1 * | 1/2007 | Hurst-Hiller | ..... | G06F 17/30654 |
| 2007/0250318 A1 * | 10/2007 | Waserblat | ............... | G10L 15/07 704/236 |
| 2007/0288422 A1 | 12/2007 | Cao | | |
| 2008/0015860 A1 * | 1/2008 | Lane | .................... | G10L 13/047 704/258 |
| 2008/0228477 A1 | 9/2008 | Fingscheidt et al. | | |
| 2009/0133051 A1 | 5/2009 | Hildreth | | |
| 2009/0177477 A1 * | 7/2009 | Nenov | ................. | A61B 5/0002 704/275 |
| 2011/0110534 A1 * | 5/2011 | Lindahl | ................. | G06F 3/0482 381/107 |
| 2011/0301943 A1 * | 12/2011 | Patch | .................... | G10L 15/265 704/9 |
| 2012/0163677 A1 | 6/2012 | Thorn | | |
| 2013/0010207 A1 | 1/2013 | Valik et al. | | |
| 2013/0185648 A1 | 7/2013 | Kim | | |
| 2013/0212501 A1 * | 8/2013 | Anderson | ............ | G06F 3/0484 715/764 |
| 2016/0155443 A1 * | 6/2016 | Khan | .................... | G06F 1/3203 704/275 |

FOREIGN PATENT DOCUMENTS

| | | |
|---|---|---|
| CN | 102867005 A | 1/2013 |
| CN | 103024521 A | 4/2013 |
| CN | 203132059 U | 8/2013 |
| EP | 1 246 146 A2 | 10/2002 |
| TW | 201223231 A1 | 6/2012 |
| WO | 2008/032329 A2 | 3/2008 |

OTHER PUBLICATIONS

Chung-Hsien Wu et al., "Emotion Recognition of Affective Speech Based on Multiple Classifiers Using Acoustic-Prosodic Information and Semantic Labels", Research Express@NCKU, IEEE Trans. Affective Computing, vol. 2, No. 1, Jan.-Mar. 2011, pp. 10-21, XP055436600.

* cited by examiner

[Fig. 1]
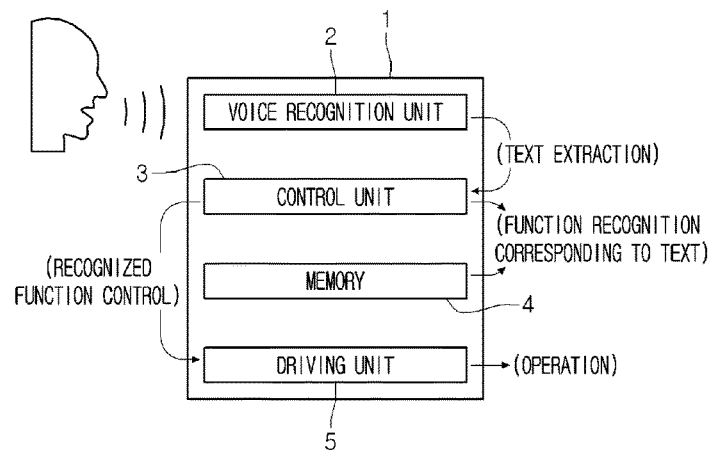
[Fig. 2]
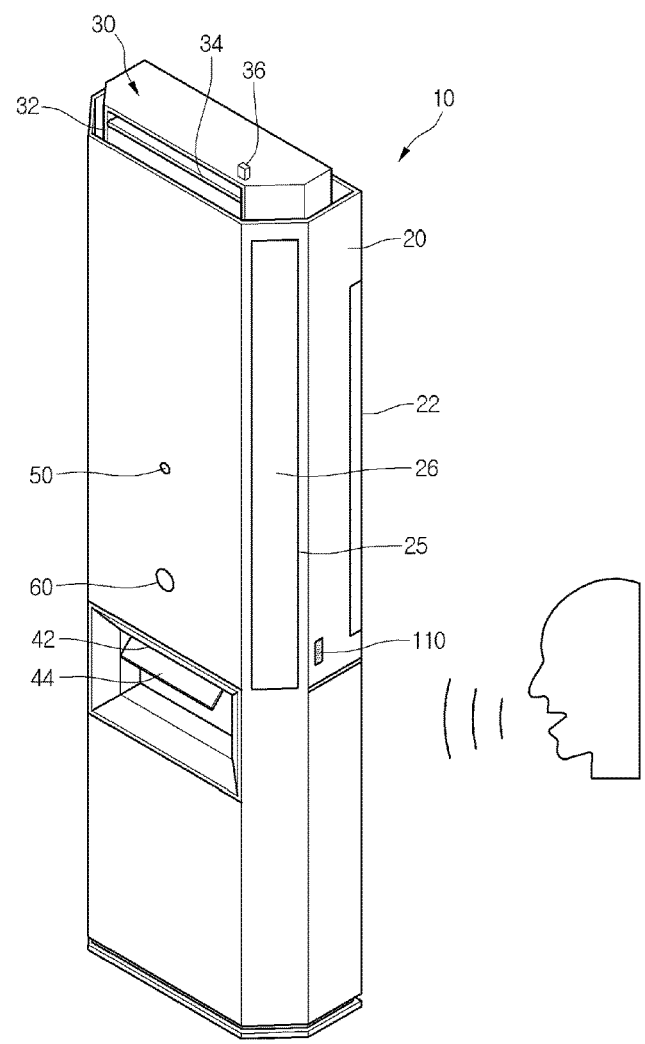

[Fig. 3]
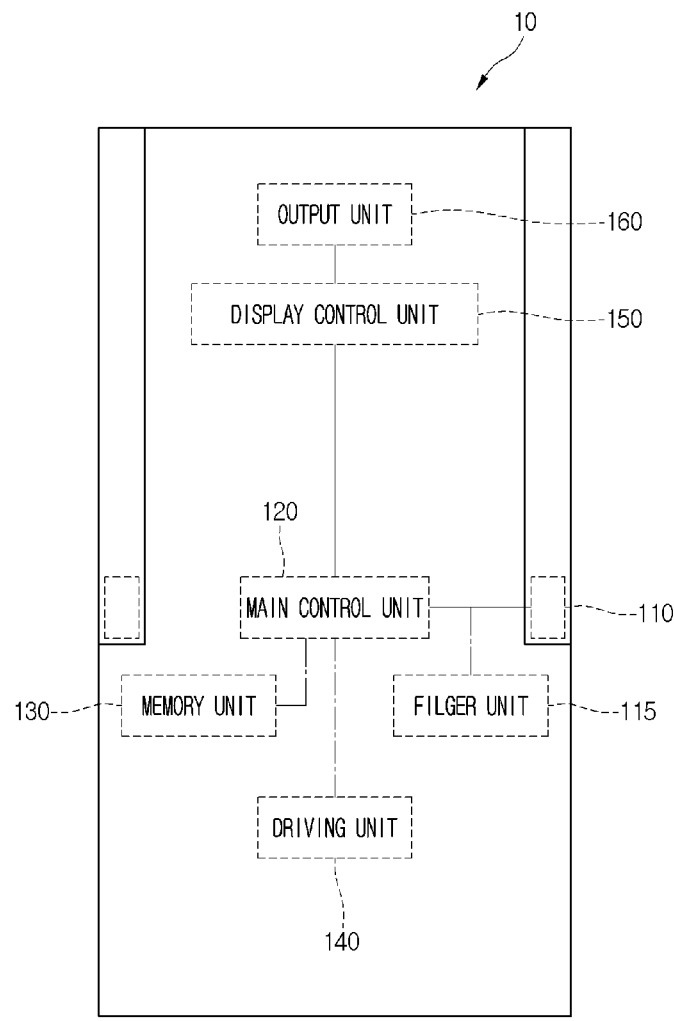
[Fig. 4]
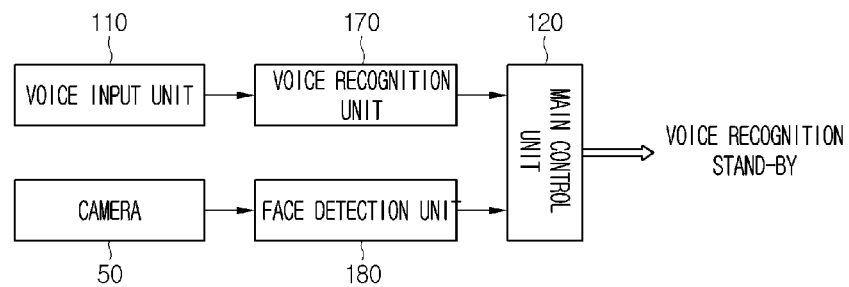

[Fig. 5]
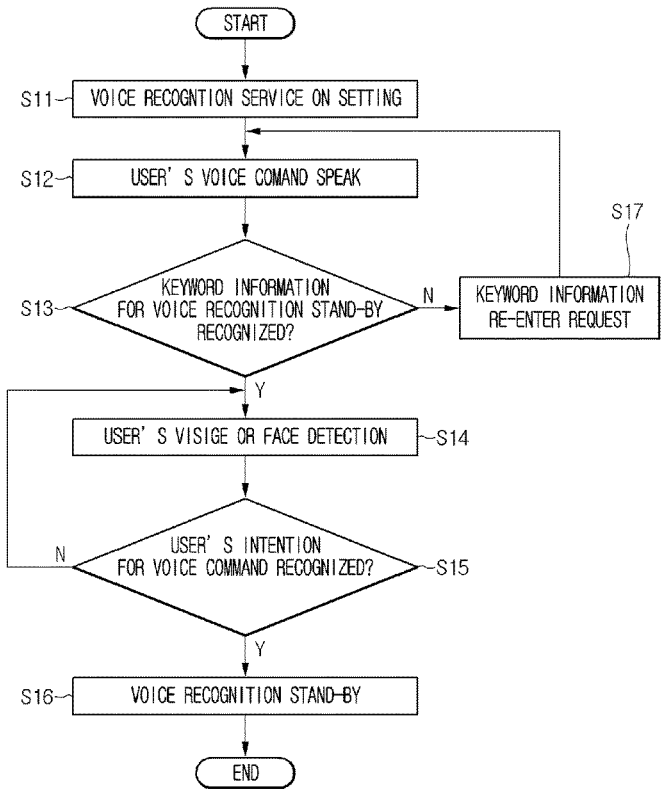
[Fig. 6]
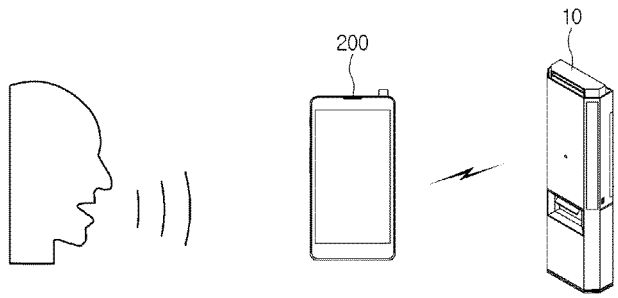
[Fig. 7]
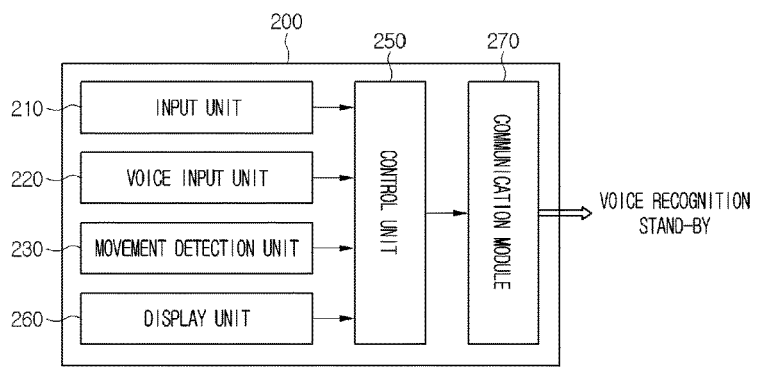

[Fig. 8]
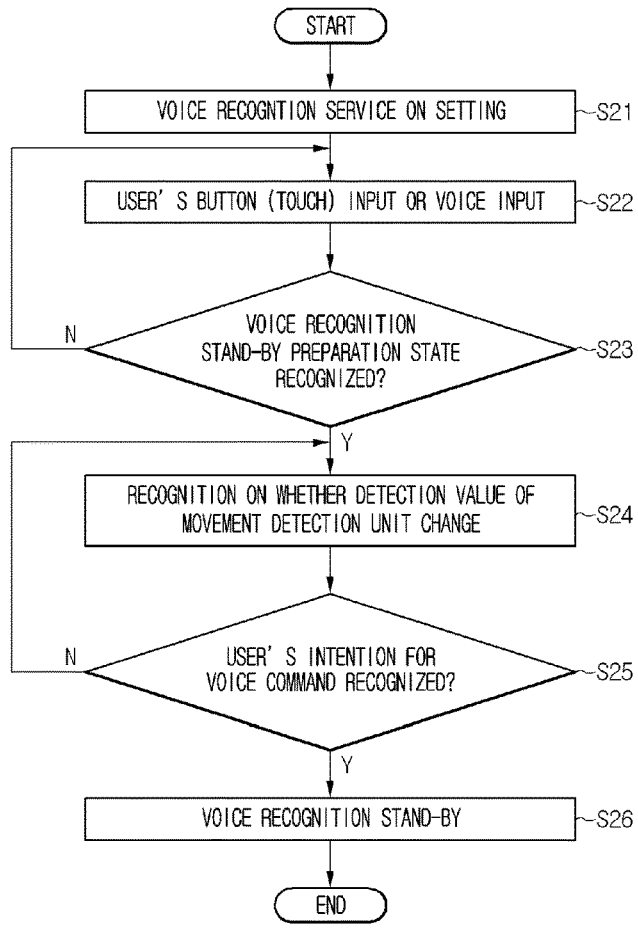
[Fig. 9]
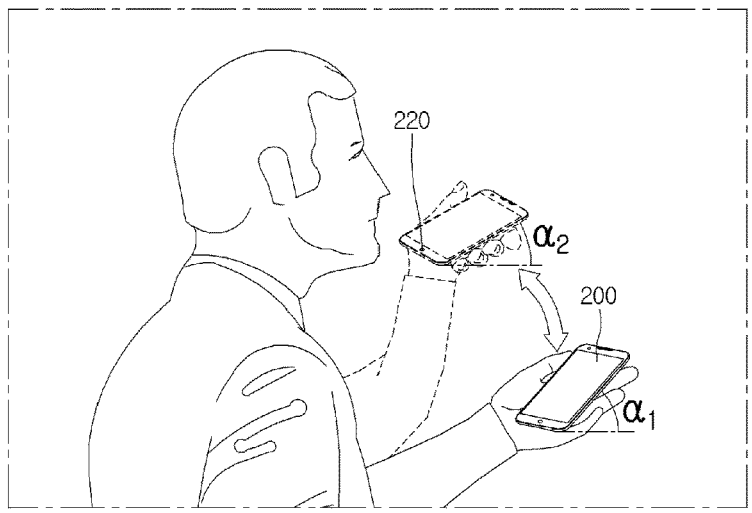

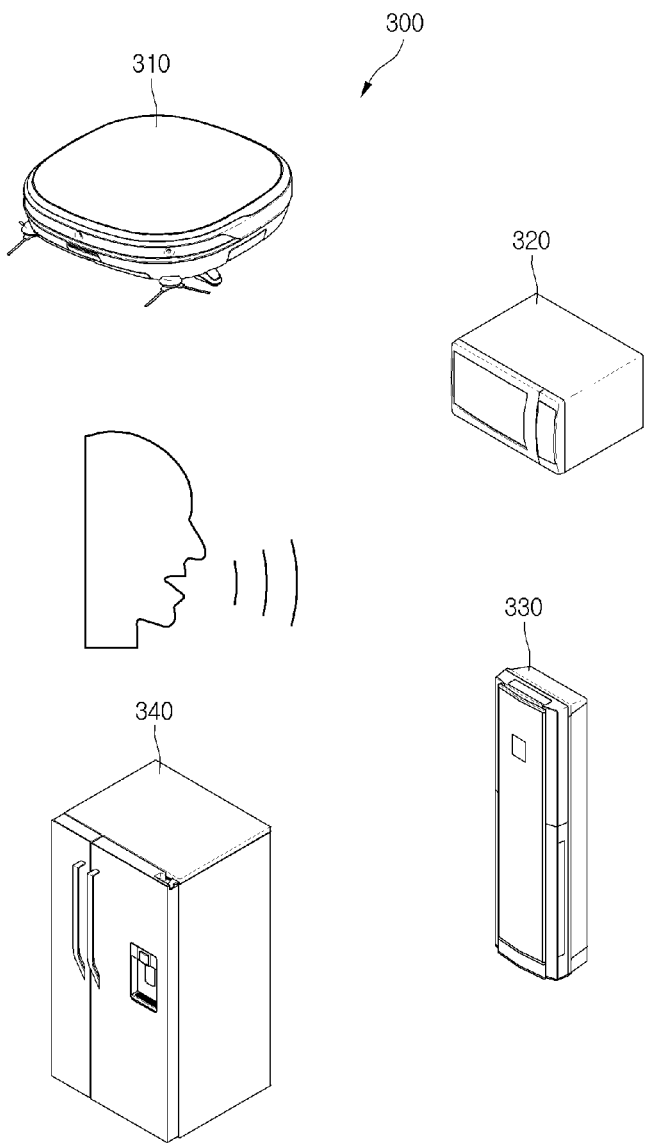
[Fig. 10]

[Fig. 11]
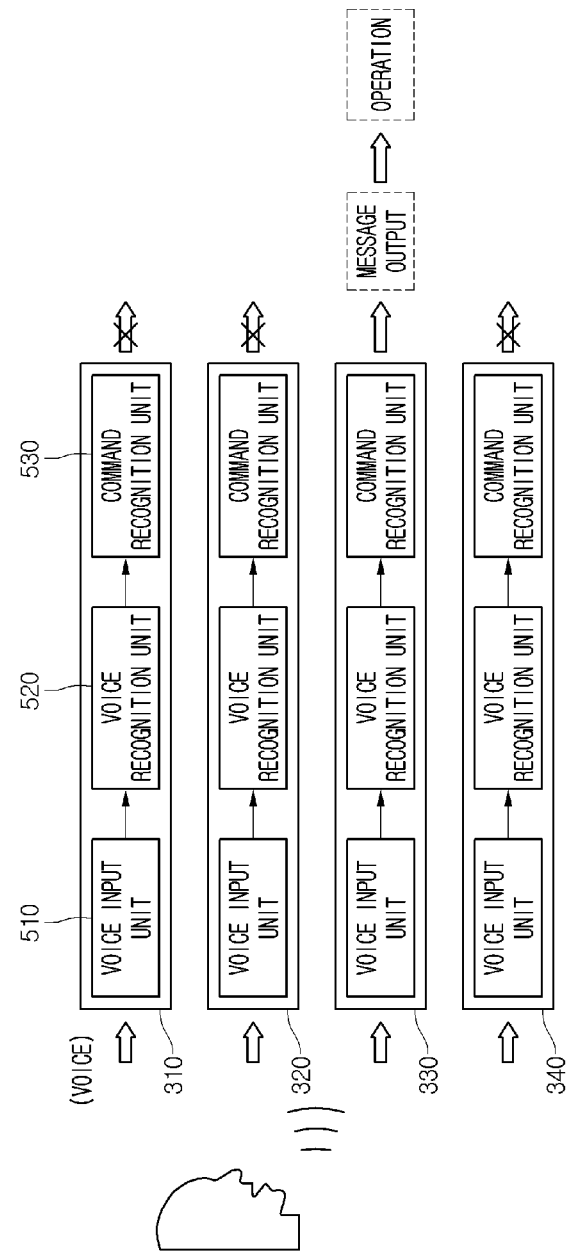

[Fig. 12]
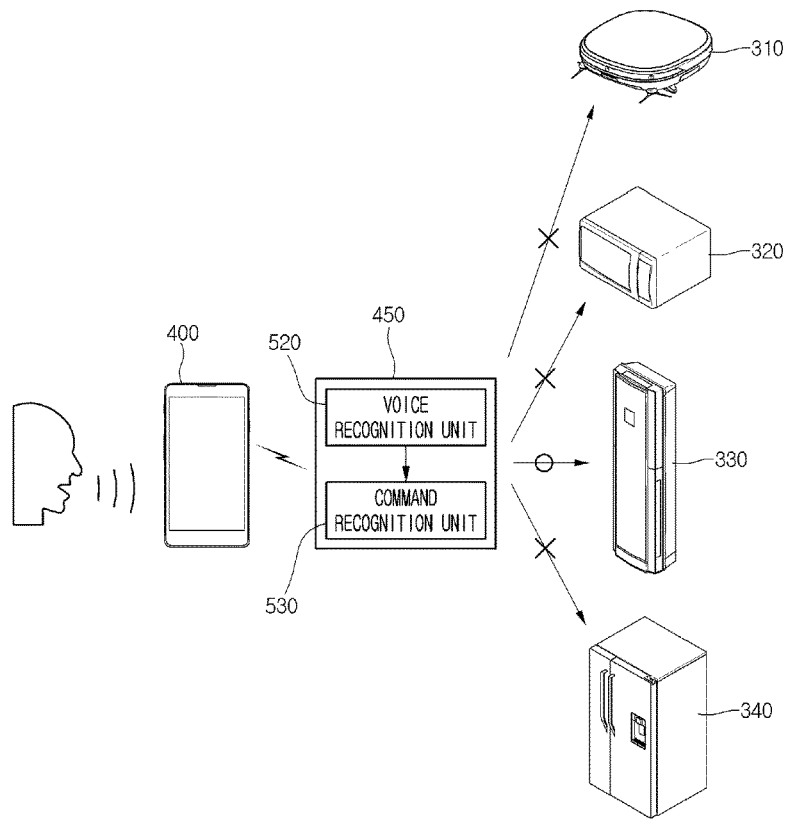
[Fig. 13]
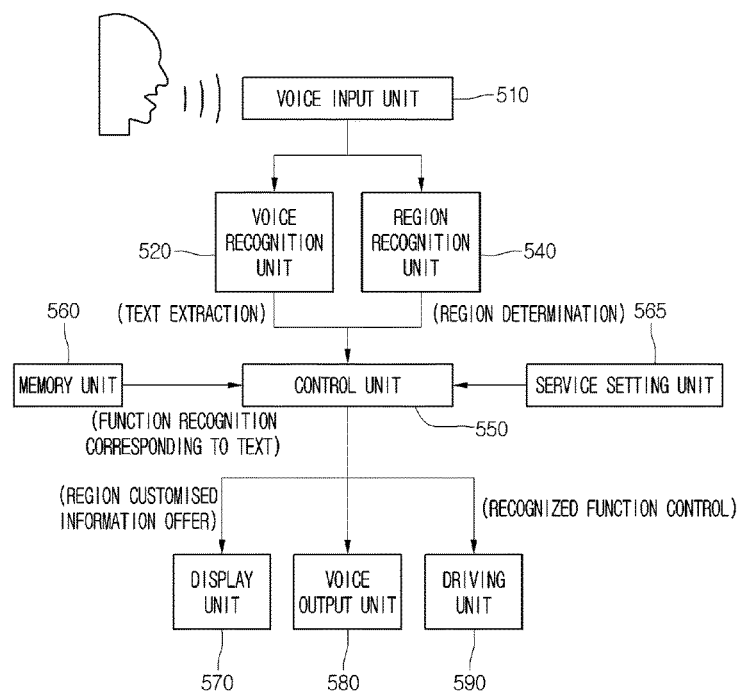

[Fig. 14]
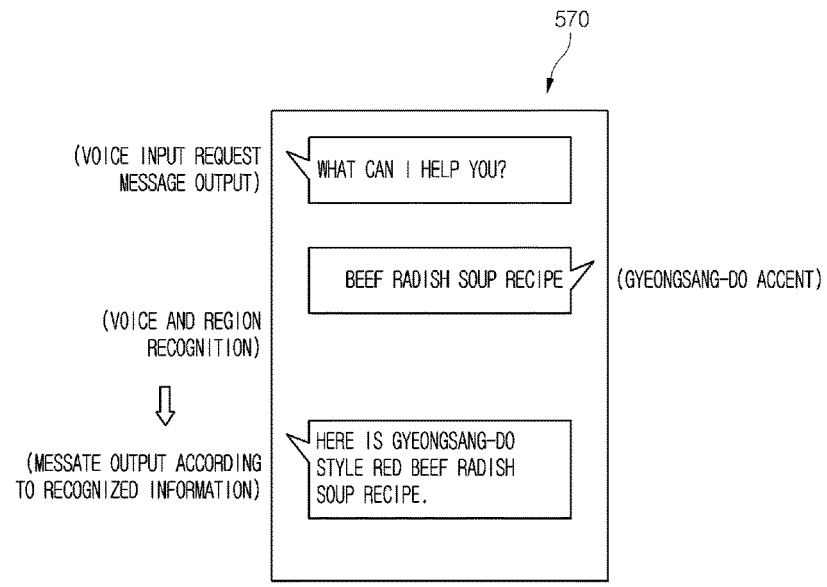
[Fig. 15]
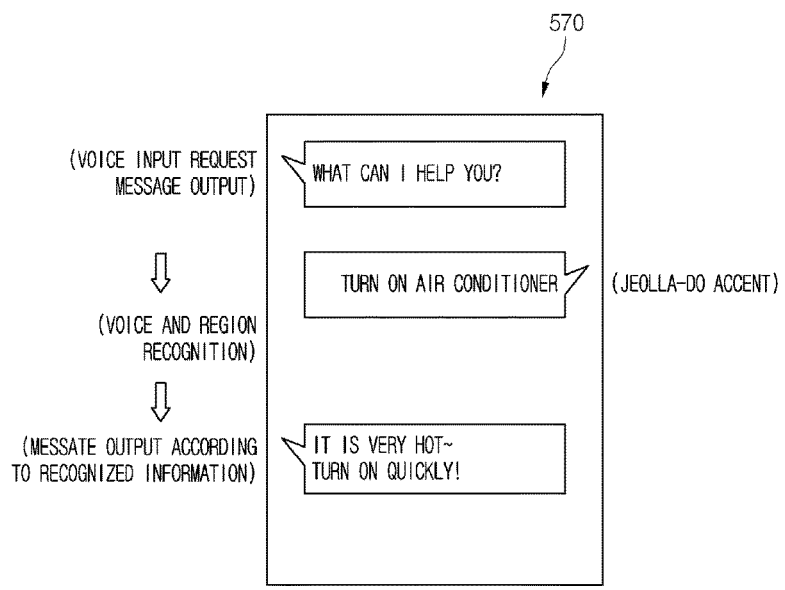

[Fig. 16a]
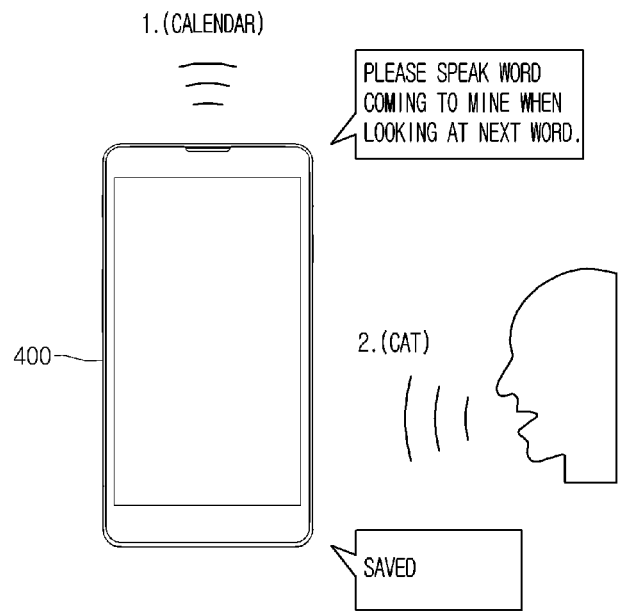
[Fig. 16b]
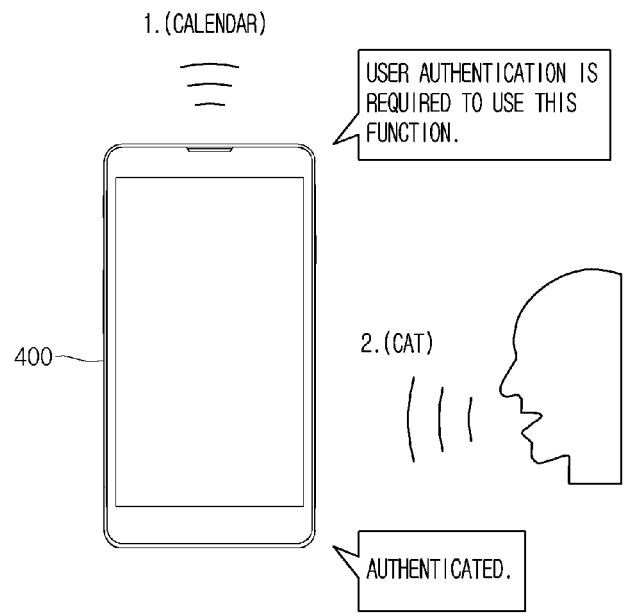

[Fig. 17]
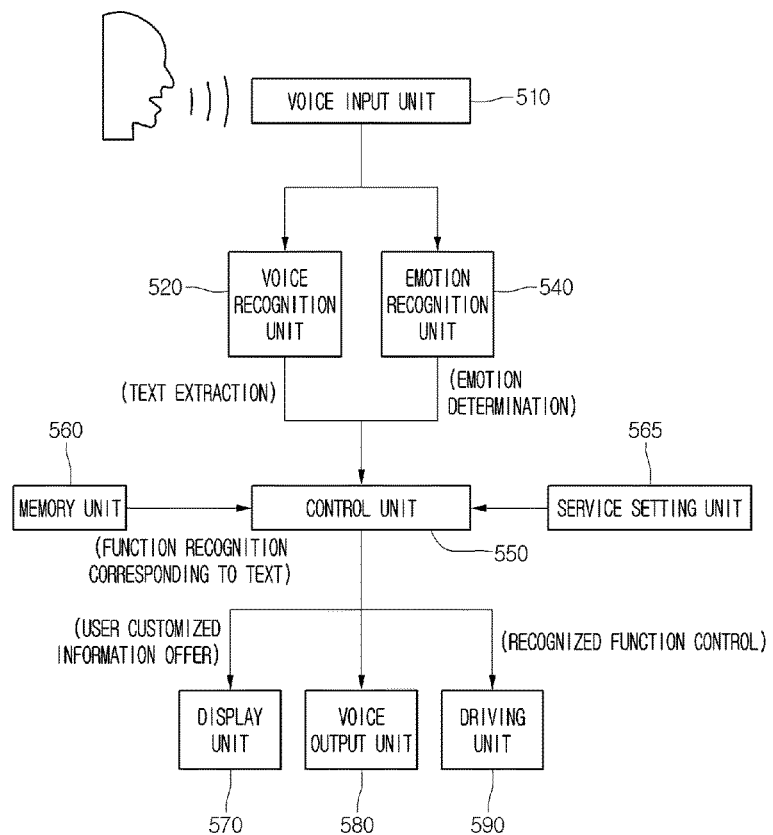
[Fig. 18]
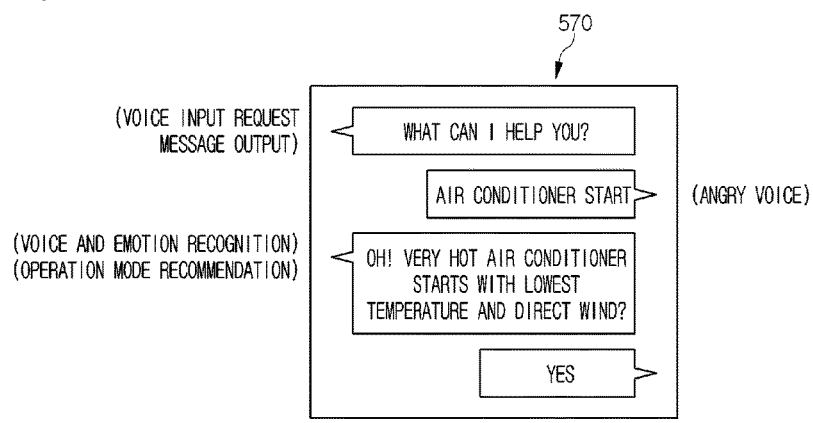

[Fig. 19]
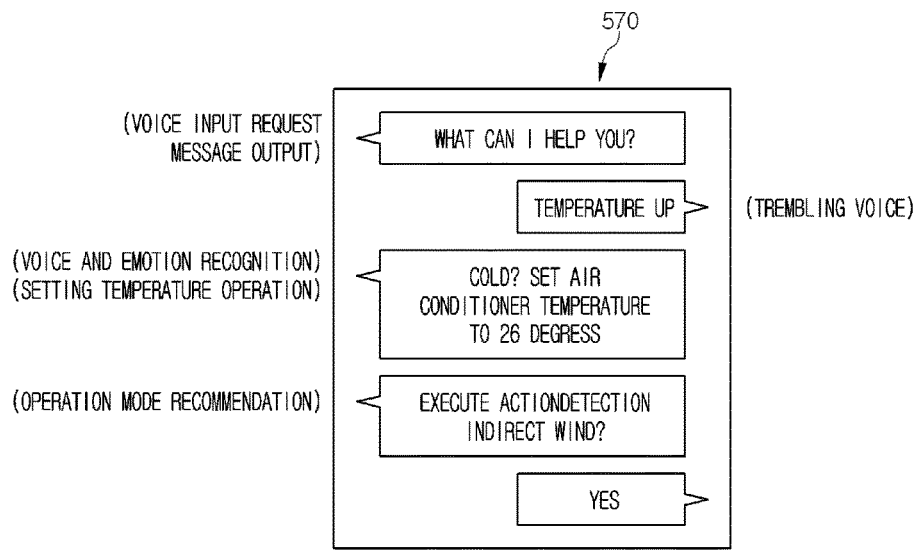
[Fig. 20]
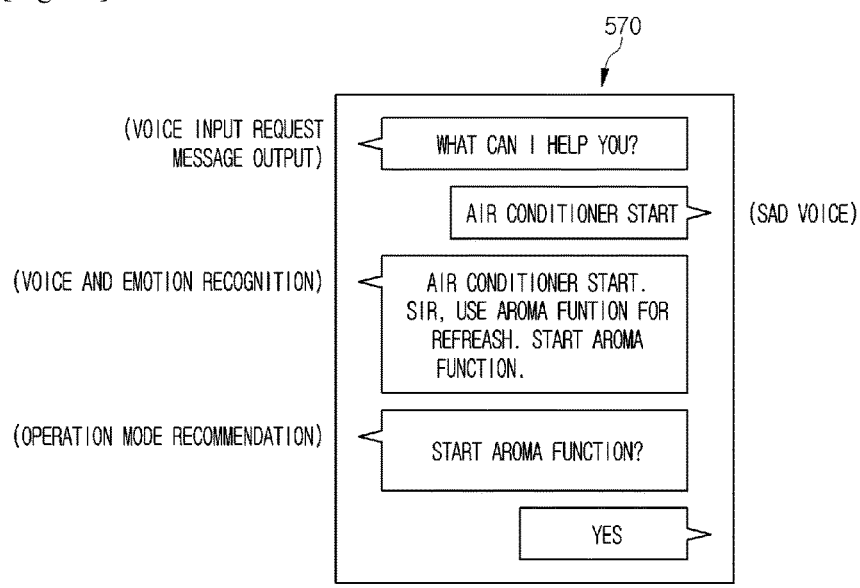

[Fig. 21a]
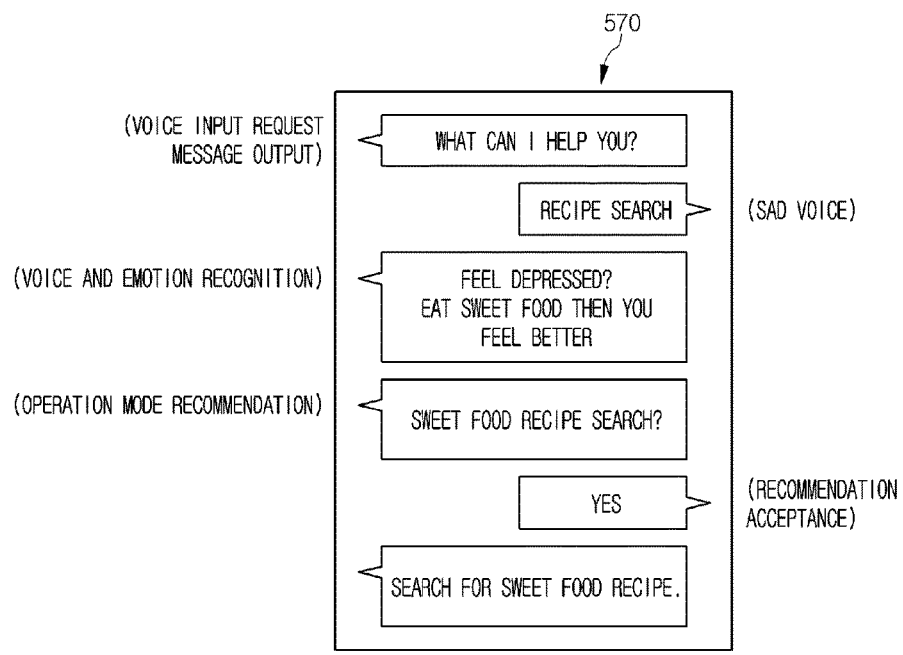
[Fig. 21b]
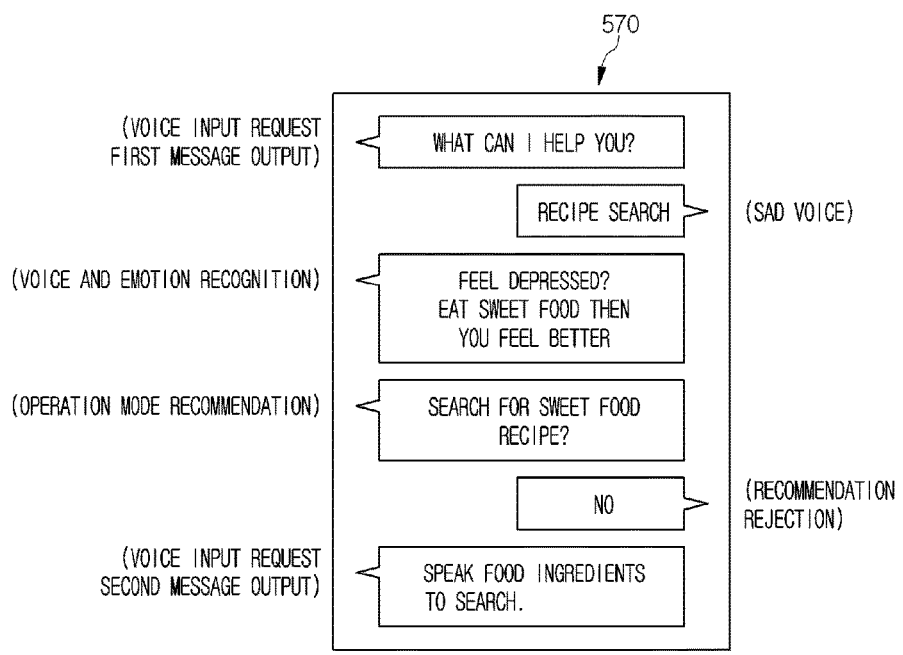

[Fig. 22]
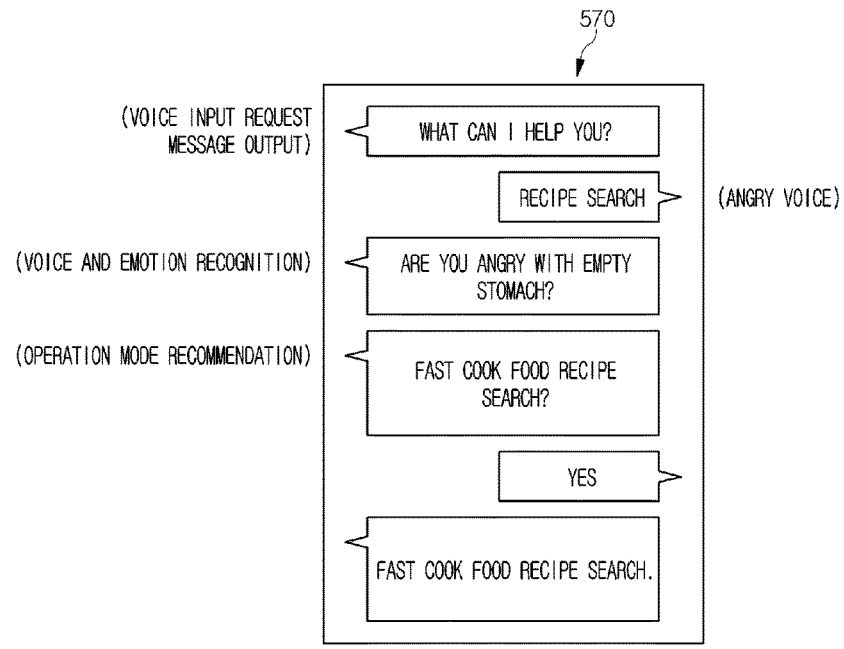
[Fig. 23]
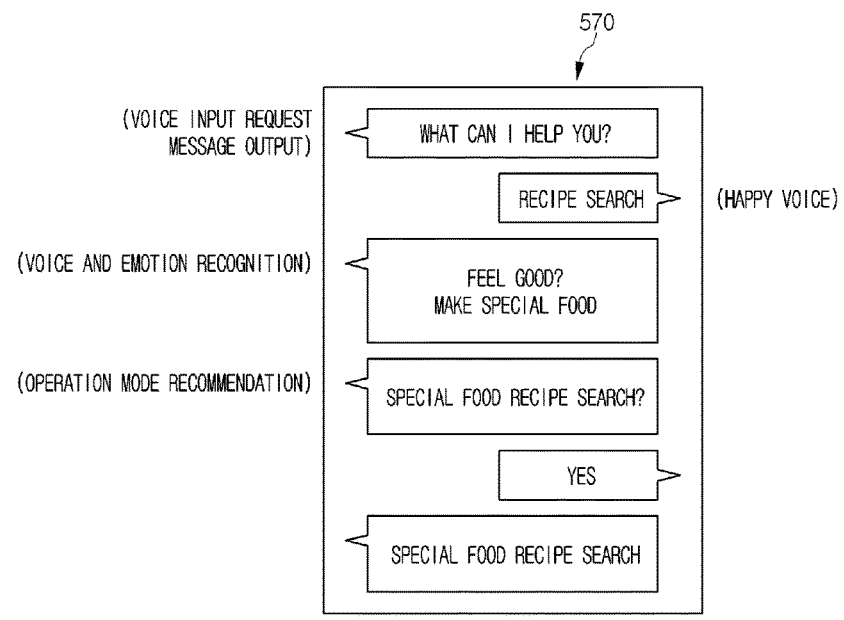

[Fig. 24]
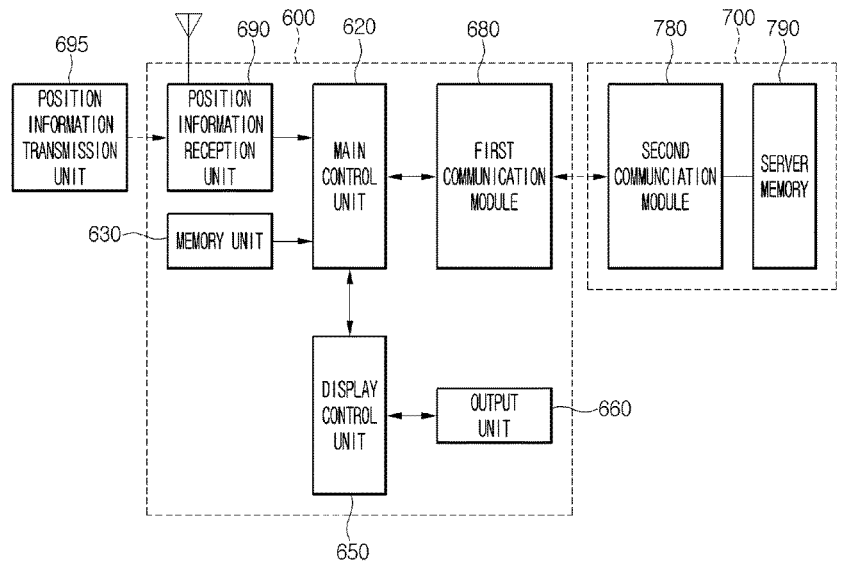
[Fig. 25]
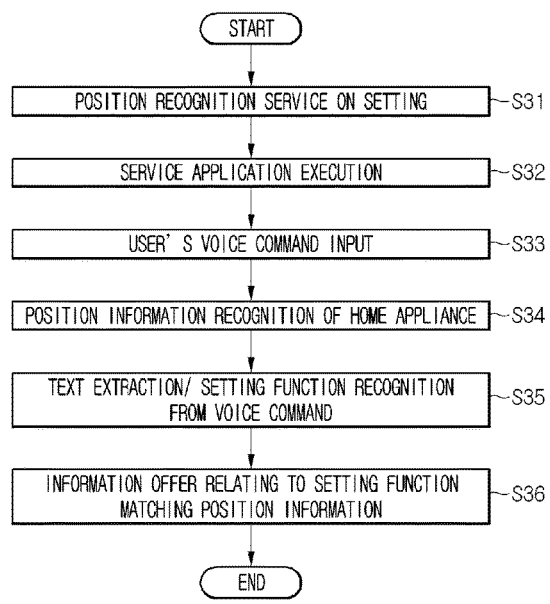

[Fig. 26]
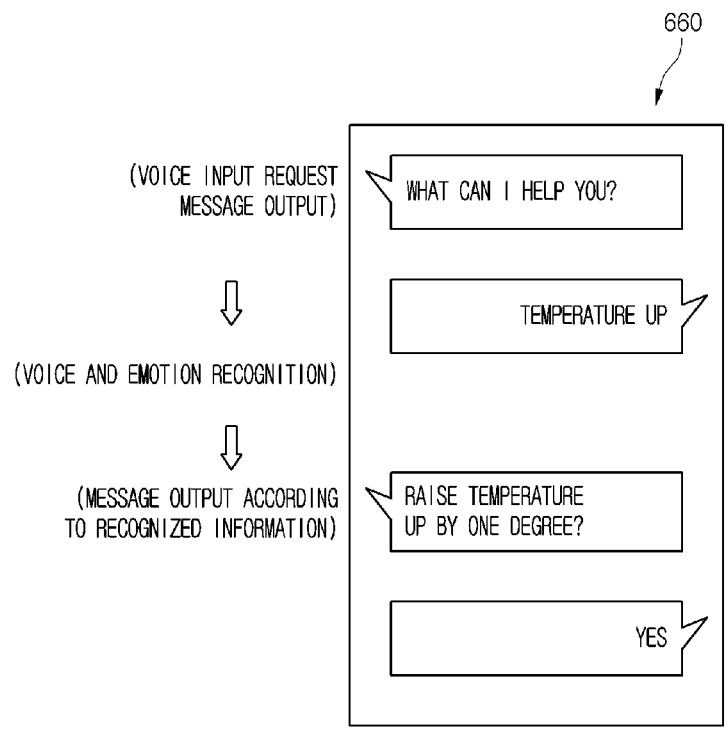
[Fig. 27]
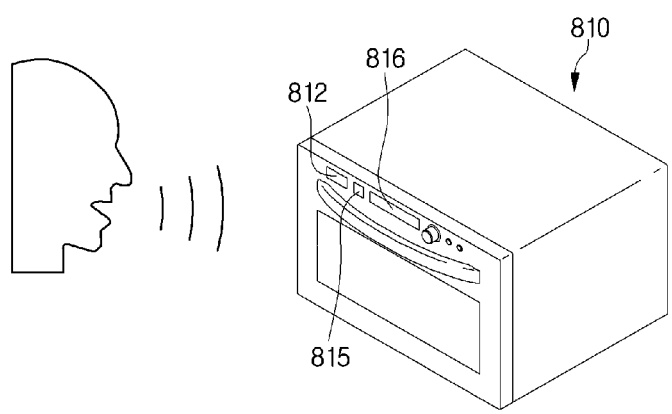

[Fig. 28a]
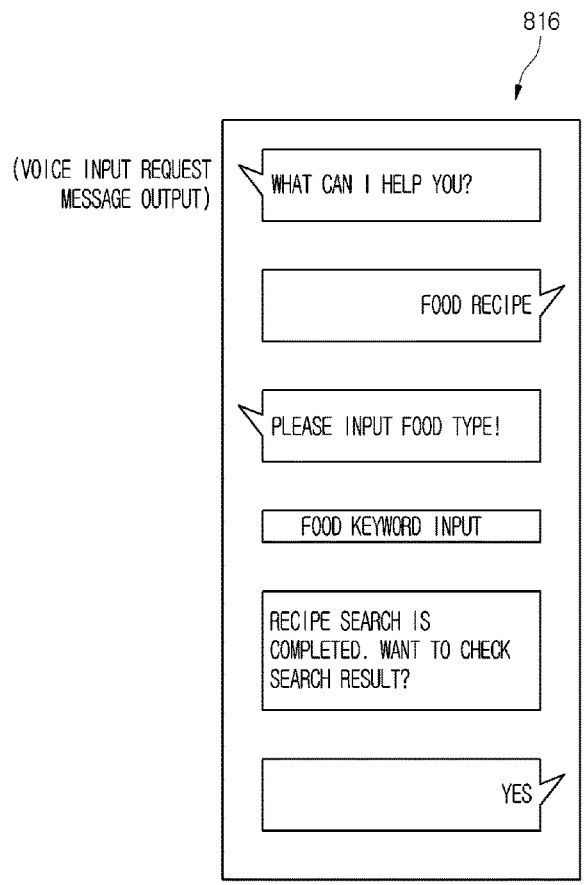
[Fig. 28b]
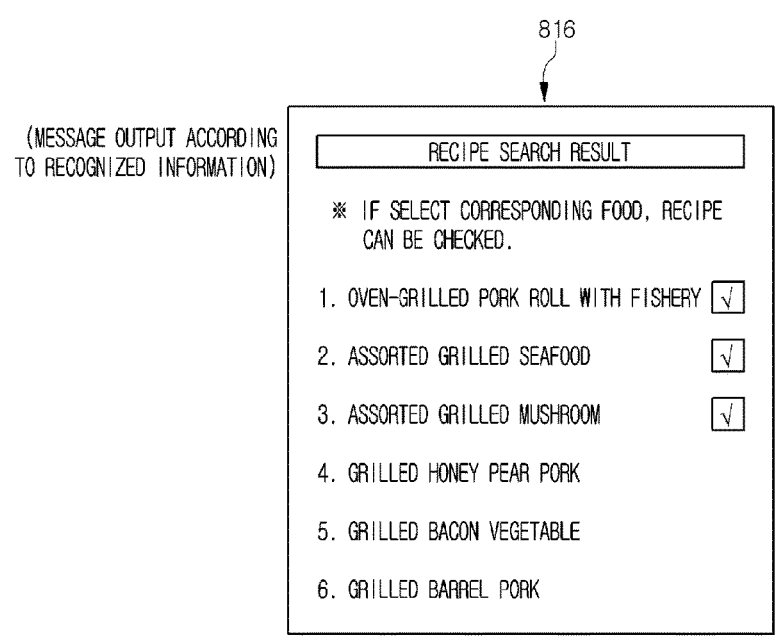

[Fig. 29]
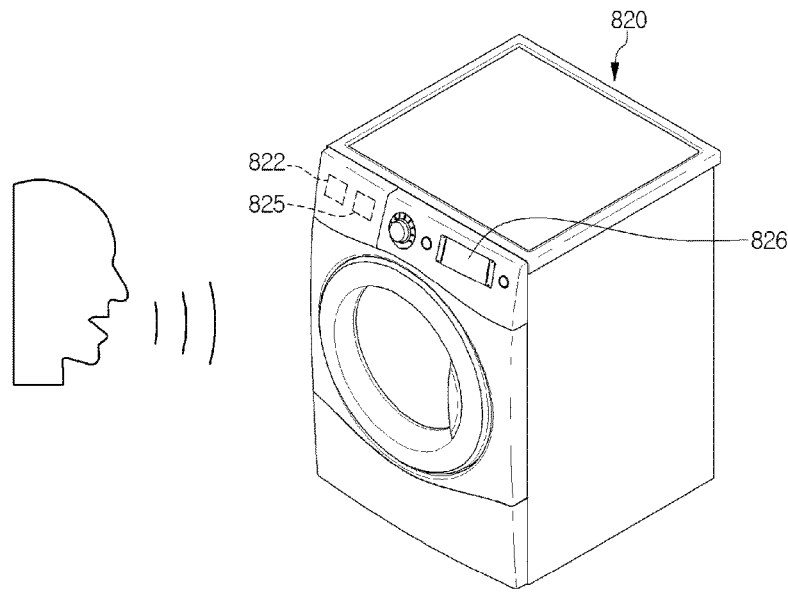
[Fig. 30]
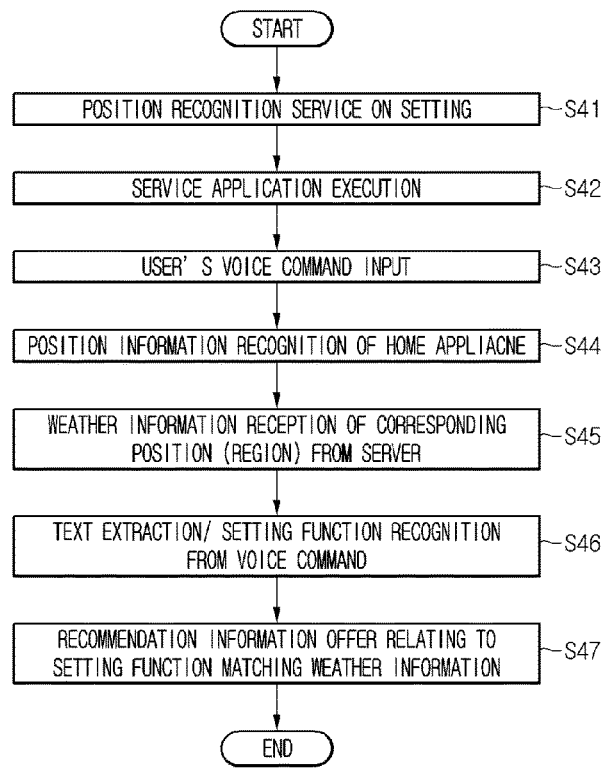

[Fig. 31]
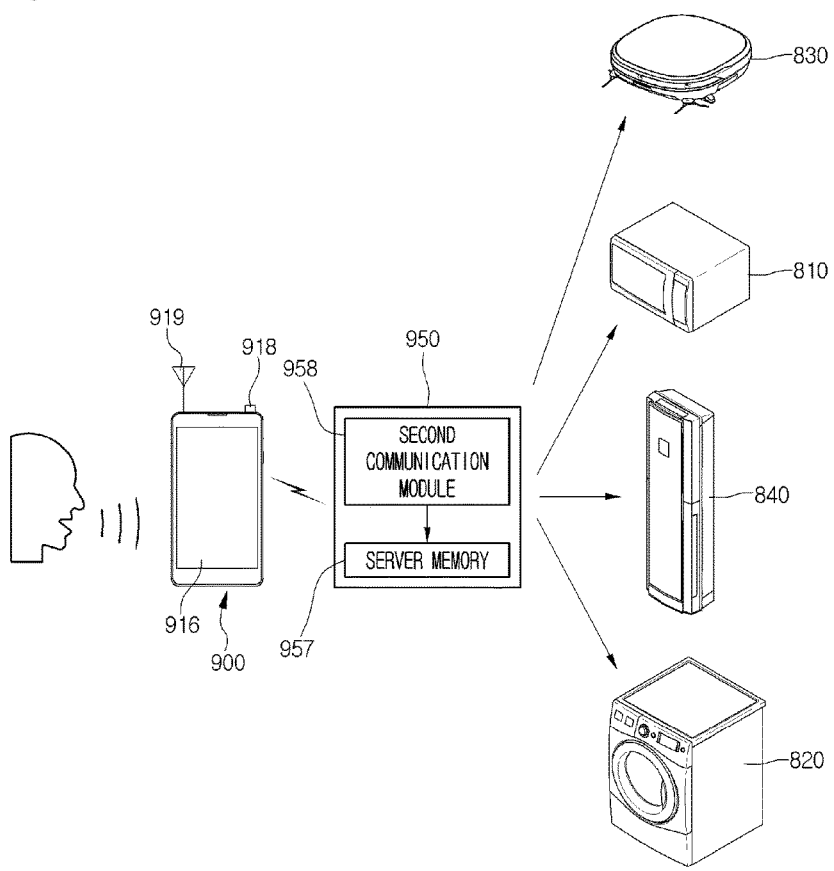

SMART HOME APPLIANCES, OPERATING METHOD OF THEREOF, AND VOICE RECOGNITION SYSTEM USING THE SMART HOME APPLIANCES

This application is a National Stage Application of International Application No. PCT/KR2014/010536, filed on Nov. 4, 2014, which claims the benefit of Korean Patent Application No. 10-2013-0153713, filed on Dec. 11, 2013, all of which are hereby incorporated by reference in their entirety for all purposes as if fully set forth herein.

TECHNICAL FIELD

The present disclosure relates to smart home appliances, an operating method thereof, and a voice recognition system using the smart home appliances.

BACKGROUND ART

Home appliances, as electronic products equipped in homes, include refrigerators, air conditioners, cookers, and vacuum cleaner. Conventionally, in order to operate such home appliances, a method of approaching and directly manipulating them or remotely controlling them through a remote controller is used.

However, with the recent developments of communication technology, a technique for inputting a command for operating home appliances by using a voice and allowing the home appliances to recognize the inputted voice content and operate is introduced.

FIG. 1 is a view illustrating a configuration of a conventional home appliance and its operating method.

A conventional home appliance includes a voice recognition unit 2, a control unit 3, a memory 4, and a driving unit 5.

When a user makes a voice meaning a specific command, the home appliance 1 collects the spoken voice and interprets the collected voice by using the voice recognition unit 2.

As an interpretation result of the collected voice, a text corresponding to the voice may be extracted. The control unit 3 compares extracted first text information and second text information stored in the memory 4 to determine whether the text is matched.

When the first and second text information matches, the control unit 3 may recognize a predetermined function of the home appliance 1 corresponding to the second text information.

Then, the control unit 3 may operate the driving unit 5 on the basis of the recognized function.

However, when such a conventional home appliance is in use, a noise source generated from the surrounding may be wrongly recognized as a voice. Additionally, even when a user simply talks with other people near a home appliance without an intention of speaking a command for voice recognition, this may be also wrongly recognized. That is, the home appliance malfunctions.

DISCLOSURE OF INVENTION

Technical Problem

Embodiments provide a smart home appliance with improved voice recognition rate, an operation method thereof, and a voice recognition system using the smart home appliance.

Solution to Problem

In one embodiment, a smart home appliance includes: a voice input unit collecting a voice; a voice recognition unit recognizing a text corresponding to the voice collected through the voice input unit; a capturing unit collecting an image for detecting a user's visage or face; a memory unit mapping the text recognized by the voice recognition unit and a setting function and storing the mapped information; and a control unit determining whether to perform a voice recognition service on the basis of at least one information of image information collected by the capturing unit and voice information collected by the voice input unit.

The control unit may include a face detection unit recognizing that a user is in a staring state for voice input when image information on a user's visage or face is collected for more than a setting time through the capturing unit.

The control unit may determine that a voice recognition service standby state is entered when it is recognized that there is keyword information in a voice through the voice input unit and a user in the staring state through the face detection unit.

The smart home appliance may further include: a filter unit removing a noise sound from the voice inputted through the voice input unit; and a memory unit mapping voice information related to an operation of the smart home appliance and voice information unrelated to an operation of the smart home appliance in advance in the voice inputted through the voice input unit and storing the mapped information.

The smart home appliance may further include: a region recognition unit determining a user's region on the basis of information on the voice collected through the voice input unit; and an output unit outputting region customized information on the basis of information on a region determined by the region recognition unit and information on the setting function.

The setting function may include a plurality of functions divided according to regions; and the region customized information including one function matching information on the region among the plurality of functions is outputted through the output unit.

The output unit may output the region customized information by using a dialect in the region determined by the region recognition unit.

The output unit may output a key word for security setting and the voice input unit may set a reply word corresponding to the key word.

The smart home appliance may further include an emotion recognition unit and an output unit, wherein the voice recognition unit may recognize a text corresponding to first voice information in the voice collected through the voice input unit; the emotion recognition unit may extract a user's emotion on the basis of second voice information in the voice collected through the voice input unit; and the output unit may output user customized information on information on a user's emotion determined by the emotion recognition unit and information on the setting function.

The first voice information may include a language element in the collected voice; and the second voice information may include a non-language element related to a user's emotion.

The emotion recognition unit may include a database where information on user's voice characteristics and information on an emotion state are mapped; and the information on the user's voice characteristics may include information on a speech spectrum having characteristics for each user's emotion.

The setting function may include a plurality of functions to be recommended or selected; and the user customized information including one function matching the information on the user's emotion among the plurality of functions is outputted through the output unit.

The smart home appliance may further include: a position information recognition unit recognizing position information; and an output unit outputting the information on the setting function on the basis of position information recognized by the position information recognition unit.

The position information recognition unit may include: a GPS reception unit receiving a position coordinate from an external position information transmission unit; and a first communication module communicably connected to a second communication module equipped in an external server.

The output unit may include a voice output unit outputting the information on the setting function as a voice by the position recognized by the position information recognition unit or a dialect used in a region.

The output unit may output information optimized for a region recognized by the position information recognition unit among a plurality of information on the setting function.

The position information recognized by the position information recognition unit may include weather information.

In another embodiment, an operating method of a smart home appliance includes: collecting a voice through a voice input unit; recognizing whether keyword information is included in the collected voice; collecting image information on a user's visage or face through a capturing unit equipped in the smart home appliance; and entering a standby state of a voice recognition service on the basis of the image information on the user's visage or face.

When the image information on the user's visage or face is collected for more than a setting time, it may be recognized that a user is in a staring state for voice input; and when it is recognized that there is keyword information in the voice and the user is in the staring state for voice input, a standby state of the voice recognition service may be entered.

The method may further include: determining a user's region on the basis of information on the collected voice; and driving the smart home appliance on the basis of information on the setting function and information on the determined region.

The method may further include outputting region customized information related to the driving of the smart home appliance on the basis of the information on the determined region.

The outputting of the region customized information may include outputting a voice or a screen by using a dialect used in the user's region.

The method may further include performing a security setting, wherein the performing of the security setting may include: outputting a set key word; and inputting a reply word in response to the suggested key word.

The method may further include: extracting a user's emotion state on the basis of information on the collected voice; and recommending an operation mode on the basis of information on the user's emotion state.

The method may further include: recognizing an installation position of the smart home appliance through a position information recognition unit; and driving the smart home appliance on the basis of information on the installation position.

The recognizing of the installation position of the smart home appliance may include receiving GPS coordinate information from a GPS satellite or a communication base station.

The recognizing of the installation position of the smart home appliance may include checking a communication address as a first communication module equipped in the smart home appliance is connected to a second communication module equipped in a server.

In further another embodiment, a voice recognition system includes: a mobile device including a voice input unit receiving a voice; a smart home appliance operating and controlled based on a voice collected through the voice input unit; and a communication module equipped in each of the mobile device and the smart home appliance, wherein the mobile device includes a movement detection unit determining whether to enter a standby state of a voice recognition service in the smart home appliance by detecting a movement of the mobile device.

The movement detection unit may include an acceleration sensor or a gyro sensor detecting a change in an inclined angle of the mobile device, wherein the voice input unit may be disposed at a lower part of the mobile device; and when a user puts the voice input unit close the mouth in order for a voice input as gripping the mobile device, an angle value detected by the acceleration sensor or the gyro sensor may be reduced.

The movement detection unit may include an illumination sensor detecting an intensity of an external light collected by the mobile device; and when a user puts the voice input unit close the mouth in order for a voice input as gripping the mobile device, an intensity value of a light detected by the illumination sensor may be increased.

The details of one or more embodiments are set forth in the accompanying drawings and the description below. Other features will be apparent from the description and drawings, and from the claims.

Advantageous Effects of Invention

According to the present invention, since a user controls an operation of a smart home appliance through a voice, usability may be improved.

Additionally, a user's face or an action for manipulating a mobile device is recognized and through this, whether a user has an intention for speaking a voice command is determined, so that voice misrecognition may be prevented.

Furthermore, when there are a plurality of voice recognition available smart home appliances, a command subject may be recognized by extracting the feature (specific word) of a command voice that a user makes and only a specific electronic product among a plurality of electronic products responds according to the recognized command subject. Therefore, miscommunication may be prevented during an operation of an electronic product.

Additionally, whether a user speaks in standard language or direct is recognized and according to the content or dialect type of the recognized voice, customized information is provided, so that user's convenience may be improved.

Moreover, since a setting on whether to use a voice recognition function of a home appliance and a security setting are possible, an arbitrary user may be prevented from using a corresponding function. Therefore, the reliability of a product operation may be increased.

Especially, happy, angry, sad, and trembling emotions may be classified from a user's voice by using mapped information of voice characteristics and emotional states in voice and on the basis of the classified emotion, an operation of a home appliance may be performed or recommended.

Additionally, since mapping information for distinguishing voice information related to an operation of an air conditioner from voice information related to noise in a user's voice is stored in the air conditioner, the misrecognition of a user's voice may be reduced.

According to the present invention, since a user controls an operation of a smart home appliance through a voice, usability may be improved. Thus, industrial applicability is remarkable.

BRIEF DESCRIPTION OF DRAWINGS

FIG. 1 is a view illustrating a configuration of a conventional home appliance and its operating method.

FIG. 2 is a view illustrating a configuration of an air conditioner as one example of a smart appliance according to a first embodiment of the present invention.

FIGS. 3 and 4 are block diagrams illustrating a configuration of the air conditioner.

FIG. 5 is a flowchart illustrating a control method of a smart home appliance according to a first embodiment of the present invention.

FIG. 6 is a schematic view illustrating a configuration of a voice recognition system according to a second embodiment of the present invention.

FIG. 7 is a block diagram illustrating a configuration of a voice recognition system according to a second embodiment of the present invention.

FIG. 8 is a flowchart illustrating a control method of a smart home appliance according to a first embodiment of the present invention.

FIG. 9 is a view when a user performs an action for starting a voice recognition by using a mobile device according to a second embodiment of the present invention.

FIG. 10 is a view illustrating a configuration of a plurality of smart home appliances according to a third embodiment of the present invention.

FIG. 11 is a view when a user makes a voice on a plurality of smart home appliances according to a third embodiment of the present invention.

FIG. 12 is a view when a plurality of smart home appliances operate by using a mobile device according to a fourth embodiment of the present invention.

FIG. 13 is a view illustrating a configuration of a smart home appliance or a mobile device and an operating method thereof according to an embodiment of the present invention.

FIG. 14 is a view illustrating a message output of a display unit according to an embodiment of the present invention.

FIG. 15 is a view illustrating a message output of a display unit according to another embodiment of the present invention.

FIGS. 16A and 16B are views illustrating a security setting for voice recognition function performance according to a fifth embodiment of the present invention.

FIG. 17 is a view illustrating a configuration of a voice recognition system and its operation method according to a sixth embodiment of the present invention.

FIGS. 18 to 20 are views illustrating a message output of a display unit according to a sixth embodiment of the present invention.

FIGS. 21A to 23 are views illustrating a message output of a display unit according to another embodiment of the present invention.

FIG. 24 is a block diagram illustrating a configuration of an air conditioner as one example of a smart home appliance according to a seventh embodiment of the present invention.

FIG. 25 is a flowchart illustrating a control method of a smart home appliance according to a seventh embodiment of the present invention.

FIG. 26 is a view illustrating a display unit of a smart home appliance.

FIG. 27 is a view illustrating a configuration of a cooker as another example of a smart home appliance according to a seventh embodiment of the present invention.

FIGS. 28A and 28B are views illustrating a display unit of the cooker.

FIG. 29 is a view illustrating a configuration of a washing machine as another example of a smart home appliance according to an eight embodiment of the present invention.

FIG. 30 is a flowchart illustrating a control method of a smart home appliance according to an eighth embodiment of the present invention.

FIG. 31 is a block diagram illustrating a configuration of a voice recognition system according to a ninth embodiment of the present invention.

BEST MODE FOR CARRYING OUT THE INVENTION

Hereinafter, specific embodiments of the present invention are described with reference to the accompanying drawings. However, the idea of the present invention is not limited to suggested embodiments and those skilled in the art may suggest other embodiments within the scope of the same idea.

FIG. 2 is a view illustrating a configuration of an air conditioner as one example of a smart appliance according to a first embodiment of the present invention. FIGS. 3 and 4 are block diagrams illustrating a configuration of the air conditioner.

Hereinafter, although an air conditioner is described as one example of a smart appliance, it should be clear in advance that the ideas related to a voice recognition or communication (information offer) procedure except for the unique setting functions of an air conditioner may be applied to other smart home appliances, for example, cleaners, cookers, washing machines, or refrigerators.

Referring to FIGS. 2 to 4, an air conditioner 10 according to the first embodiment of the present invention includes a suction part 22, discharge parts 25 and 42, and a case 20 forming an external appearance. The air conditioner 10 shown in FIG. 2 may be an indoor unit installed in an indoor space to discharge air.

The suction part 22 may be formed at the rear of the case 20. Then, the discharge parts 25 and 42 include a main discharge part 25 through which the air suctioned through the suction part 22 is discharged to the front or side of the case 20 and a lower discharge part 42 discharging the air downwardly.

The main discharge parts 25 may be formed at the both sides of the case 20 and its opening/closing degree may be adjusted by a discharge vane 26. The discharge vane 26 may be rotatably provided at one side of the main discharge part 25. The opening/closing degree of the lower discharge part 42 may be adjusted by a lower discharge vane 44.

A vertically movable upper discharge device 30 may be provided at an upper part of the case 20. When the air conditioner 10 is turned on, the upper discharge device 30 may move to protrude from an upper end of the case 20 toward an upper direction and when the air conditioner 10 is turned off, the upper discharge device 30 may move downwardly and may be received inside the case 20.

An upper discharge part 32 discharging air is defined at the front of the upper discharge device 30 and an upper discharge vane 34 adjusting a flow direction of the discharged air is equipped inside the upper discharge device 30. The upper discharge vane 34 may be provided rotatably.

A voice input unit 110 receiving a user's voice is equipped on at least one side of the case 20. For example, the voice input unit 110 may be equipped at the left side or right side of the case 20. The voice input unit 110 may be referred to as a "voice collection unit" in that it is possible to collect voice. The voice input unit 110 may include a microphone. The voice input unit 110 may be disposed at the rear of the main discharge unit 25 so as not to be affected by the air discharged from the main discharge part 25.

The air conditioner 10 may further include a body detection unit 36 detecting a body in an indoor space or a body's movement. For example, the body detection unit 36 may include at least one of an infrared sensor and a camera. The body detection unit 36 may be disposed at the front part of the upper discharge device 30.

The air conditioner 10 may further include a capsule injection device 60 through which a capsule with aroma is injected. The capsule input device 60 may be installed at the front of the air conditioner 10 to be withdrawable. When a capsule is inputted to the capsule input device 60, a capsule release device (not shown) disposed inside the air conditioner 10 pops the capsule and a predetermine aroma fragrance is diffused. Then, the diffused aroma fragrance may be discharged to the outside of the air conditioner 10 together with the air discharged from the discharge parts 25 and 42. According to types of the capsule, aroma fragrance may be provided variously, for example, lavender, rosemary or peppermint.

The air conditioner 10 may include a filter unit 115 for removing noise sound from a voice inputted through the voice input unit 110. The voice may be filtered into a voice frequency easy for voice information through the filter unit 115.

The air conditioner 10 includes control units 120 and 150 recognizing information for an operation of the air conditioner 10 from the voice information passing through the filter unit 115. The control units 120 and 150 include a main control unit 120 controlling an operation of the driving unit 140 in order for an operation of the air conditioner 10 and an output unit 160 communicably connected to the main control unit 120 and controlling the output unit 160 to display operation information of the air conditioner 10 to the outside.

The driving unit 140 may include a compressor or a blow fan. Then, the output unit 160 includes a display unit displaying operation information of the air conditioner 10 as an image and a voice output unit outputting the operation information as a voice. The voice output unit may include a speaker. The voice output unit may be disposed at one side of the case 20 and may be provided separated from the voice input unit 110.

Then, the air conditioner 10 may include a memory unit 130 mapping and storing voice information related to an operation of the air conditioner 10 and voice information irrelevant to an operation of the air conditioner 10 in advance among voices inputted through the voice input unit 110. First voice information, second voice information, and third voice information are stored in the memory unit 130.

In more detail, frequency information defining the first to third voice information may be stored in the memory unit 130.

The first voice information may be understood as voice information related to an operation of the air conditioner 10, that is, keyword information. When it is recognized that the first voice information is inputted, an operation of the air conditioner 10 corresponding to the inputted first voice information may be performed or stop. The memory unit 130 may include text information corresponding to the first voice information and information on a setting function corresponding to the text information.

For example, when the first voice information corresponds to ON of the air conditioner 10, as the first voice information is recognized, an operation of the air conditioner 10 starts. On the other hand, when the first voice information corresponds to OFF of the air conditioner 10, as the first voice information is recognized, an operation of the air conditioner 10 stops.

As another example, when the first voice information corresponds to one operation mode of the air conditioner 10, that is, air conditioning, heating, ventilation or dehumidification, as the first voice information is recognized, a corresponding operation mode may be performed. As a result, the first voice information and an operation method (on/off and an operation mode) of the air conditioner 10 corresponding to the first voice information may be mapped in advance in the memory unit 130.

The second voice information may include frequency information similar to the first voice information related to an operation of the air conditioner 10 but is substantially understood as voice information related to an operation of the air conditioner 10. Herein, the frequency information similar to the first voice information may be understood as frequency information showing a frequency difference between the first voice information and the inside of a setting range.

When it is recognized that the second voice information is inputted, corresponding voice information may be filtered as noise information. That is, the main control unit 120 may recognize the second voice information but may not perform an operation of the air conditioner 10.

The third voice information may be understood as voice information irrelevant to an operation of the air conditioner 10. The third voice information may be understood as frequency information showing a frequency difference between the first voice information and the outside of a setting range. The second voice information and the third voice information may be referred to as "unrelated information" in that they are voice information unrelated to an operation of the air conditioner 10.

In such a way, since voice information related to an operation of a home appliance and voice information unrelated to an operation of a home appliance are mapped and stored in advance in a smart home appliance, voice recognition may be performed effectively.

The air conditioner 10 includes a camera 50 as a capturing unit capturing a user's face. For example, the camera 50 may be installed at the front part of the air conditioner 10.

The air conditioner 10 may further include a face detection unit 180 recognizing that a user looks at the air conditioner 10 in order for voice recognition on the basis of an image captured through the camera 50. The face detection unit 180 may be installed inside the camera 50 or installed separately in the case 20, in order for one function of the camera 50. When the camera 50 captures a user's face for a predetermined time, the face detection unit 180 recognizes that a user stares at the air conditioner 10 in order for voice input (that is, a staring state).

The air conditioner 10 further include a voice recognition unit 170 extracting text information from a voice collected through the voice input unit 110 and recognizing a setting function of the air conditioner 10 on the basis of the extracted text information.

The information recognized by the voice recognition unit 170 or the face detection unit 180 may be delivered to the main control unit 120. The main control unit 120 may realize a user's intention of using a voice recognition service and may then enter a standby state on the basis of the information recognized by the voice recognition unit 170 and the face detection unit 180.

Although the voice recognition unit 170, the face detection unit 180, and the main control unit 120 are separately configured as shown in FIG. 4, the voice recognition unit 170 and the face detection unit 180 may be installed as one component of the main control unit 120. That is, the voice recognition unit 170 may be understood as a function component of the main control unit 120 to perform a voice recognition function and also the face detection unit 170 may be understood as a function component of the main control unit 120 to perform a face detection function.

FIG. 5 is a flowchart illustrating a control method of a smart home appliance according to a first embodiment of the present invention.

Referring to FIG. 5, in controlling a smart home appliance according to the first embodiment of the present invention, a voice recognition service may be set to be turned on. The voice recognition service is understood as a service controlling an operation of the air conditioner 10 by inputting a voice command. For example, in order to turn on the voice recognition service, a predetermined input unit (not shown) may be manipulated. Of course, when a user does not want to use a voice recognition service, it may be set to be turned off in operation S11.

Then, a user speaks a predetermined voice command in operation S12. The spoken voice is collected through the voice input unit 110. It is determined whether keyword information for activating voice recognition is included in the collected voice.

The keyword information, as first voice information stored in the memory unit 130, is understood as information that a user may input to start a voice recognition service. That is, even when the voice recognition service is set to be turned on, the keyword information may be inputted in order to represent a user's intention of using a voice recognition service after the current time.

For example, the keyword information may include pre-mapped information such as "turn on air conditioner" or "voice recognition start". In such a manner, at the beginning of using a voice recognition service, by inputting the keyword information, a time for preparation to minimize surrounding noise or conversation is provided to a user.

When it is recognized that the keyword information is included in a voice command inputted through the voice input unit 110, it is recognized whether a user truly has an intention for voice command.

On the other hand, when it is recognized that the keyword information is not included in the voice command, a request message for re-inputting keyword information may be outputted from the output unit 160 of the air conditioner 10.

Whether a user truly has an intention for voice command may be determined based on whether a user's visage or face is detected for more than a setting time through the camera 50. For example, the setting time may be 2 sec to 3 sec.

When a user stares at the camera 50 at the front of the air conditioner 10, the camera 50 captures the user's visage or face and transmits it to the face detection unit 180.

Then, the face detection unit 180 may recognize whether a user stares at the camera 50 for a setting time. When the face detection unit 180 recognizes the user's staring state, the main control unit 120 determines that the user has an intention on voice command and enters a voice recognition standby state in operations S14 and S15.

As entering the voice recognition standby state, a filtering process is performed on all voice information collected through the input unit 110 of the air conditioner 10 and then, whether there is a voice command is recognized. The termination of the voice recognition standby state may be performed when a user inputs keyword information for voice recognition termination as voice or manipulates an additional input unit in operation S16.

In such a way, since whether to activate a voice recognition service is determined by simply recognizing keyword information according to a voice input or detecting a user's visage or face, voice misrecognition may be prevented.

Although it is described with reference to FIG. 5 that the user face detection operation is performed after the voice keyword information recognition operation, unlike this, after the user face detection operation, the voice keyword information recognition operation may be performed.

As another example, although it is described with reference to FIG. 5 that when two conditions on the voice keyword information recognition and the user face detection are satisfied, the voice recognition standby is entered, when any one condition on the voice keyword information recognition and the user face detection is satisfied, the voice recognition standby may be entered.

Hereinafter, a second embodiment of the present invention is described. In this embodiment, since there is a difference from the first embodiment in that a voice recognition service is performed through a mobile device, the difference is mainly described and for the same parts as in the first embodiment, the description and reference numbers of the first embodiment are incorporated.

FIG. 6 is a schematic view illustrating a configuration of a voice recognition system according to a second embodiment of the present invention.

Referring to FIG. 6, the voice recognition system includes a mobile device 200 receiving a user's voice input and an air conditioner 10 operating and controlled based on a voice inputted to the mobile device 200. The air conditioner 10 is just one example of a smart home appliance. Thus, the idea of this embodiment is applicable to other smart home appliances. The mobile device 200 may include a smartphone, a remote controller, and a tap book.

The mobile device 200 may include a voice input available voice input unit 220, a manipulation available input unit 210, a display unit equipped at the front part to display information on an operation state of the mobile device 200 or information provided from the mobile device 200, and a movement detection unit 230 detecting a movement of the mobile device 200.

The voice input unit 220 may include a mike. The voice input unit 220 may be disposed at a lower part of the mobile device 200. The input unit 210 may include a user press manipulation available button or a user touch manipulation available touch panel.

Then, the movement detection unit 230 may include an acceleration sensor or a gyro sensor. The acceleration sensor or the gyro sensor may detect information on an inclined angle of the mobile device 200, for example, an inclined angle with respect to the ground.

For example, when a user stands up the mobile device 200 in order to stare at the display unit 260 of the mobile device 200 and a users lays down the mobile terminal 200 in order to input a voice command through the voice input unit 220, the acceleration sensor or the gyro sensor may detect a different angle value according to the standing degree of the mobile device 200.

As another example, the movement detection unit 230 may include an illumination sensor. The illumination sensor may detect the intensity of external light collected according the standing degree of the mobile device 200. For example, when a user stands up the mobile device 200 in order to stare at the display unit 260 of the mobile device 200 and a users lays down the mobile terminal 200 in order to input a voice command through the voice input unit 220, the acceleration sensor or the gyro sensor may detect a different angle value according to the standing degree of the mobile device 200.

The mobile device 200 further includes a control unit 250 receiving information detected by the input unit 210, the voice input unit 230, the display unit 260, and the movement detection unit 230 and recognizing a user's voice command input intention, and a communication module 270 communicating with the air conditioner 10.

For example, a communication module of the air conditioner 10 and the communication module 270 of the mobile device 100 may directly communicate with each other. That is, direct communication is possible without going through a wireless access point by using Wi-Fi-Direct technique, an Ad-Hoc mode (or network), or Bluetooth.

In more detail, WiFi-Direct may mean a technique for communicating at high speed by using communication standards such as 802.11a, b, g, and n regardless of the installation of an access point. This technique is understood as a communication technique for connecting the air conditioner 10 and the mobile device 200 by using Wi-Fi wirelessly without internet network.

The Ad-Hoc mode (or Ad-Hoc network) is a communication network including only mobile hosts without a fixed wired network. Since there are no limitations in the movement of a host and it does not require a wired network and a base station, fast network configuration is possible and its cost is inexpensive. That is, wireless communication is possible without the access point. Accordingly, in the Ad-Hoc mode, without the access point, wireless communication is possible between the air conditioner 10 and the mobile device 200.

In the Bluetooth communication, as a short-range wireless communication method, wireless communication is possible within a specific range through a pairing process between a communication module (a first Bluetooth module) of the air conditioner 10 and the communication module 270 (a second Bluetooth module) of the mobile device.

As another example, the air conditioner 10 and the mobile device 200 may communicate with each other through an access point and a server (not shown) or a wired network. When a user's voice command intention is recognized, the control unit 250 may transmit to the air conditioner 10 information that the voice recognition service standby state is entered through the communication module 270.

FIG. 8 is a flowchart illustrating a control method of a smart home appliance according to a second embodiment of the present invention. FIG. 9 is a view when a user performs an action for starting a voice recognition by using a mobile device according to a second embodiment of the present invention.

Referring to FIG. 8, in controlling a smart home appliance according to the second embodiment of the present invention, a voice recognition service may be set to be turned on in operation S21.

Then, a user may input or speak a command for a voice recognition standby preparation state through a manipulation of the input unit 210 or the voice input unit 220. When an input of the input unit 210 is recognized or it is recognized that keyword information for voice recognition standby is included in a voice collected through the voice input unit 220, it is determined that "voice recognition standby preparation state" is entered.

As described in the first embodiment, the keyword information, as first voice information stored in the memory unit 130, is understood as information that a user may input to start a voice recognition service in operations S22 and S23.

When it is recognized that "the voice recognition standby preparation state" is entered, whether a user truly has an intention on voice command is recognized. On the other hand, when it is not recognized that "the voice recognition standby preparation state" is entered, operation S22 and the following operations may be performed again.

Whether a user truly has an intention on voice command may be determined based on whether a detection value is changed in the movement detection unit 230. For example, when the movement detection unit 230 includes an acceleration sensor or a gyro sensor, whether a value detected by the acceleration sensor or the gyro sensor is changed is recognized. The change may depend on whether an inclined value (or range) at which the mobile device 200 stands changes into an inclined value (or range) at which the mobile device 200 lies.

As shown in FIG. 9, while a user stares at the display unit 260 as gripping the mobile device 200, the mobile device 200 may stand up somewhat. At this point, an angle at which the mobile device 200 makes with the ground may be al.

On the other hand, when a user inputs a predetermined voice command through the voice input unit 220 disposed at a lower part of the mobile device 200 as gripping the mobile device 200, the mobile device 200 may lie somewhat. At this point, an angle at which the mobile device 200 makes with the ground may be $\alpha 2$. Then, $\alpha 1 > \alpha 2$. Values for $\alpha 1$ and $\alpha 2$ may be predetermined within a predetermined setting range.

When a value detected by the acceleration sensor or the gyro sensor changes from a setting range of $\alpha 1$ into a setting range of $\alpha 2$, it is recognized that a users puts the voice input unit 220 close to a user's mouth. In this case, it is recognized that the user has an intention on voice command.

As another example, when the movement detection unit 230 includes an illumination sensor, it is recognized whether a value detected by the illumination sensor is changed. The change may depend on whether the intensity of light (first intensity) collected when the mobile device 200 stands changes into the intensity of light (second intensity) collected when the mobile device 200 lies.

Herein, the second intensity may be formed greater than the first intensity. That is, the intensity of light collected from the outside when the mobile device 200 lines may be greater than the intensity of light collected from the outside when the mobile device 200 stands. Herein, values for the first intensity and the second intensity may be predetermined within a predetermined setting range.

When it is detected that a value detected by the illumination sensor changes from a setting range of the first intensity into a setting range of the second intensity, it is determines that a user puts the voice input unit 220 closer to the user's mouth. In this case, it is recognized that the user has an intention on voice command in operations S24 and S25.

Through such a method, when it is recognized that the user has an intention on voice command, a voice recognition standby state may be entered. As entering the voice recognition standby state, a filtering process is performed on all voice information collected through the voice input unit 220 of the air conditioner 10 and then, whether there is a voice command is recognized.

The termination of the voice recognition standby state may be performed when a user inputs keyword information for voice recognition termination as voice or manipulates an additional input unit. In such a way, since whether keyword information according to a simple voice input is recognized and whether to activate a voice recognition service is determined by detecting a movement of a mobile device, voice misrecognition may be prevented in operation S26.

Although it is described with reference to FIG. 8 that the movement detection operation of the mobile device is performed after the user's button (touch) input or voice input operation, the user's button (touch) input or voice input operation may be performed after the movement detection operation of the mobile device.

As another example, although it is descried with reference to FIG. 8 that when two conditions on the user's button (touch) input or voice input operation and the movement detection operation of the mobile device are satisfied, a voice recognition standby is entered, when any one condition on the user's button (touch) input or voice input operation and the movement detection operation of the mobile device is satisfied, the voice recognition standby state may be entered.

FIG. 10 is a view illustrating a configuration of a plurality of smart home appliances according to a third embodiment of the present invention. FIG. 11 is a view when a user makes a voice on a plurality of smart home appliances according to a third embodiment of the present invention.

Referring to FIG. 10, a voice recognition system 10 according to the third embodiment of the present invention includes a plurality of voice recognition available smart home appliances 310, 320, 330, and 340. For example, the plurality of smart home appliances 310, 320, 330, and 340 may include a cleaner 310, a cooker 320, an air conditioner 330, and a refrigerator 340.

The plurality of smart home appliances 310, 320, 330, and 340 may be in a standby state for receiving a voice. The standby state may be entered when a user sets a voice recognition mode in each smart home appliance. Then, the setting of the voice recognition mode may be accomplished by an input of a predetermined input unit or an input of a set voice.

The plurality of smart home appliances 310, 320, 330, and 340 may be disposed together in a predetermined space. In this case, even when a user speaks a predetermined voice command toward a specific one among the plurality of smart home appliances 310, 320, 330, and 340, another home appliance may react to the voice command. Accordingly, this embodiment is characterized in that when a user makes a predetermined voice, a target home appliance to be commanded is estimated or determined appropriately.

In more detail, referring to FIG. 11, each of the smart home appliances 310, 320, 330, and 340 includes a voice input unit 510, a voice recognition unit 520, and a command recognition unit 530.

The voice input unit 510 may collects voices that a user makes. For example, the voice input unit 510 may include a microphone. The voice recognition unit 520 extracts a text from the collected voice. The command recognition unit 530 determines whether there is a text where a specific word related to an operation of each home appliance is used by using the extracted text. The command recognition unit 530 may include a memory storing information related to the specific word.

If a voice in which the specific word is used is included in the collected voice, the command recognition unit 530 may recognize that a corresponding home appliance is a home appliance that is a user's command target. The voice recognition unit 520 and the command recognition unit 530 are functionally distinguished and described but may be equipped inside one controller.

A home appliance recognized as a command target may output a message that whether a user's command target is the home appliance itself. For example, when a home appliance recognized as a command target is the air conditioner 330, a voice or text message "turn on air conditioner?" may be outputted. At this, the outputted voice or text message is referred to as "recognition message".

According thereto, when an operation of the air conditioner 330 is desired, a user may input a recognition or confirmation message that an air conditioner is a target, for example, a concise message "air conditioner operation" or "OK". At this, the inputted voice message is referred to as "confirmation message".

On the other hand, if a voice in which the specific word is used is not included in the collected voice, the command recognition unit 530 may recognize that corresponding home appliances, that is, the cleaner 310, the cooker 320, and the refrigerator 340, are excluded from a user's command target. Then, even when a user's voice is inputted for a setting time after the recognition, the home appliances excluded from the command target are not recognized as the user's command target and do not react to the user's voice.

It is shown in FIG. 11 that when it is recognized that a voice corresponding to the air conditioner 330 among a plurality of home appliances is inputted, a recognition message is outputted and an operation in response to an inputted command is performed.

Moreover, when a home appliance recognized as the command target is more than one, as mentioned above, each home appliance may output a confirmation message that whether a user's command target is each home appliance itself. Then, a user may specify a home appliance that is a command target by inputting a voice for the type of a home appliance to be commanded among a plurality of home appliances.

For example, when there are the voice recognition available cleaner 310, cooker 320, air conditioner 330, and refrigerator 340 together in home, as a user makes a voice "air conditioning start", the air conditioner 330 recognizes that a specific word "air conditioning" is used and also recognizes that the home appliance itself is a command target. Of course, information on the text "air conditioning" may be stored in the memory of the air conditioner 330 in advance.

On the other hand, since the word "air conditioning" is not a specific word of a corresponding home appliance with respect to the cleaner 310, the cooker 320, and the air conditioner 330, it is recognized that the home appliances 310, 320, and 330 are excluded from the command target.

As another example, when a user makes the voice "temperature up", the cooker 320, the air conditioner 330, and the refrigerator 340 may recognize that a specific word "temperature" is used. That is, the plurality of home appliances 320, 330, and 340 may recognize that they are the command targets.

At this point, the plurality of home appliances 320, 330, and 340 may output a message that whether the user's command targets are the home appliances 320, 330, and 340 themselves. Then, as a user inputs a voice for a specific home appliance, for example, "air conditioner", it is specified that a command target is the air conditioner 330. When a command target is specified in the above manner, an operation of a home appliance may be controlled through an interactive communication between a user and a corresponding home appliance.

In such a manner, when there are a plurality of voice recognition available smart home appliances, a command subject may be recognized by extracting the feature (specific word) of a voice that a user makes and only a specific electronic product among a plurality of electronic products responds according to the recognized command subject. Therefore, miscommunication may be prevented during an operation of an electronic product.

FIG. 12 is a view when a plurality of smart home appliances operate by using a mobile device according to a fourth embodiment of the present invention.

Referring to FIG. 12, a voice recognition system 10 according to the fourth embodiment of the present invention includes a mobile device 400 receiving a user's voice input, a plurality of home appliances 310, 320, 330, and 340 operating and controlled based on a voice inputted to the mobile device 400, and a server 450 communicably connecting the mobile device 400 and the plurality of home appliances 310, 320, 330, and 340.

The mobile device 400 is equipped with the voice input unit 510 described with reference to FIG. 11 and the server 450 includes the voice recognition unit 520 and the command recognition unit 530.

The mobile device 400 may include an application connected to the server 400. Once the application is executed, a voice input mode for user's voice input may be activated in the mobile device 400.

When a user's voice is inputted through the voice input unit 510 of the mobile device 400, the inputted voice is delivered to the server 450 and the server 450 determines which home appliance is the target of a voice command as the voice recognition unit 520 and the command recognition unit 530 operate.

When a specific home appliance is recognized as the command target on the basis of a determination result, the server 450 notifies the specific home appliance of the recognized result. The home appliance notified of the result responses to a user's command. For example, when the air conditioner 330 is recognized as a command target and notified of a result, it may output a recognition message such as "turn on air conditioner?". According thereto, a user may input a confirmation message such as "OK" or "air conditioner operation". In relation to this, the contents described with reference to FIG. 11 are used.

FIG. 13 is a view illustrating a configuration of a smart home appliance or a mobile device and an operating method thereof according to an embodiment of the present invention. Configurations shown in FIG. 13 may be equipped in smart home appliances or mobile devices. Hereinafter, smart home appliances will be described for an example.

Referring to FIG. 13, a smart home appliance according to an embodiment of the present invention includes a voice input unit 510 receiving a user's voice input and a voice recognition unit 520 extracting a text from a voice collected through the voice input unit 510. The voice recognition unit 520 may include a memory unit where the frequency of a voice and a text are mapped.

The smart home appliance may further include a region recognition unit 540 extracting the intonation of a voice inputted from the voice input unit 510 to determine the local color of the voice, that is, which region dialect is used. The region recognition unit 540 may include a database for dialects used in a plurality of regions. The database may store information on the intonation recognized when speaking in dialect, that is, unique frequency changes.

The text extracted through the voice recognition unit 520 and the information on a region determined through the region recognition unit 540 may be delivered to the control unit 550.

The smart home appliance may further include a memory unit 560 mapping the text extracted by the voice recognition unit 520 and a function corresponding to the text and storing them.

The control unit 550 may recognize a function corresponding to the text extracted by the voice recognition unit 520 on the basis of the information stored in the memory unit 560. Then, the control unit 550 may control a driving unit 590 equipped in the home appliance in order to perform the recognized function.

For example, the driving unit 560 may include a suction motor of a cleaner, a motor or a heater of a cooker, a compressor motor of an air conditioner, or a compressor motor of a refrigerator.

The home appliance further includes a display unit 570 outputting or providing region customized information to a screen or a voice output unit 580 outputting a voice on the basis of a setting function corresponding to the text extracted by the voice recognition unit 520 and the region information determined by the region recognition unit 540. The combined display unit 570 and voice output unit 580 may be referred to as "output unit"

That is, the setting function may include a plurality of functions divided according to regions and one function matching the region information determined by the region recognition unit 540 among the plurality of functions may be outputted. In summary, combined information of the recognized function and the determined local color may be inputted to the display unit 570 or the voice output unit 580 (region customized information providing service).

Moreover, the smart home appliance further includes a selection available mode setting unit 565 to perform a mode for the region customized information providing service. A user may use the region customized information providing service when the mode setting unit 565 is in "ON" state. Of course, a user may not use the region customized information providing service when the mode setting unit 565 is in "OFF" state.

Hereinafter, by referring to the drawings, contents of region customized information outputted to the display unit 570 are described.

FIG. 14 is a view illustrating a message output of a display unit according to an embodiment of the present invention.

Referring to FIG. 14, the display unit 570 may be equipped in the cooler 320, the refrigerator 340, or the mobile device 400. Hereinafter, the display unit 570 equipped at the refrigerator 340 is described for an example.

The cooler 320 or the refrigerator 340 may provide information on a recipe for a predetermined cooking to a user. In other words, the cooker 320 or the refrigerator 340 may include a memory unit storing recipe information on at least one cooking.

When a region customized information providing service is used to obtain recipe information, a user may provide an input when the mode setting unit 565 of the refrigerator 340 is ON state.

When the region customized information providing service starts, for example, a guide message such as "what can I help you", that is, a voice input request message, may be displayed on a screen of the display unit 570. Of course, the voice input request message may be outputted as a voice through the voice output unit 580.

As shown in FIG. 14, a user may input a specific recipe for the voice input request message, for example, as shown in FIG. 14, a voice "beef radish soup recipe". The refrigerator 340 receives and recognizes a user's voice command and extracts a text corresponding to the recognized voice command. Accordingly, the display unit 570 may display a screen "beef radish soup recipe".

Then, the refrigerator 340 extracts the intonation from a voice inputted by a user and recognizes a frequency change corresponding to the extracted intonation, so that it may recognize a dialect for a specific region.

For example, when a user inputs a voice "beef radish soup recipe" in Gyeongsang-do accent, the refrigerator 340 recognizes the Gyeongsang-do dialect and prepares to provide a recipe optimized for Gyeongsang-do region. That is, there are a plurality of beef radish recipes according to regions, one recipe matching the recognized region, Gyeongsang-do, may be recommended.

As a result, the refrigerator 340 may recognize that a user in Gyeongsang-do region wants to receive ""beef radish soup recipe" and may then, read information on a Gyeongsang-do style radish recipe to provide it to a user. For example, the display unit 570 may display a message "here is Gyeongsang-do style red beef radish soup recipe". In addition, a voice message may be outputted through the voice output unit 580.

Another example is described.

When the smart home appliance is an air conditioner for conditioning an indoor space and recognizes that a user' region is a cold region such as Gangwon-do, as a user inputs a voice command "temperature down", under the assumption that a user in cold region likes cold weather, the smart home appliance may operate to set a relatively low temperature as a setting temperature. Then, information on contents related to adjusting a setting temperature to a relatively low temperature, for example, 20° C., may be outputted to the output units 570 and 580.

According to such a configuration, without a user's input for specific information, the dialect that a user speaks is recognized and region customized information is provided on the basis of the recognized dialect information. Therefore, usability may be improved.

FIG. 15 is a view illustrating a message output of a display unit according to another embodiment of the present invention.

Referring to FIG. 15, the display unit 570 according to another embodiment of the present invention may be equipped in the air conditioner 330 or the mobile device 400. When a region customized information providing service is used to input a command for an operation of the air conditioner 330, a user may provide an input when the mode setting unit 545 of the air conditioner 330 is in ON state.

When the region customized information providing service starts, for example, a guide message such as "what can I help you", that is, a voice input request message, may be displayed on a screen of the display unit 570. Of course, the voice input request message may be outputted as a voice through the voice output unit 580.

With respect to the voice input request message, a user may input a command on an operation of the air conditioner 300, for example, as shown in FIG. 15, a voice "turn on air conditioner (in dialect)". The air conditioner 330 receives and recognizes a user's voice command and extracts a text corresponding to the recognized voice command. Accordingly, the display unit 570 may display a screen "turn on air conditioner (in dialect)".

Then, the air conditioner 330 extracts the intonation from a voice inputted by a user and recognizes a frequency change corresponding to the extracted intonation, so that it may recognize a dialect for a specific region. For example, when a user inputs a voice "turn on air conditioner" in Jeolla-do accent, the air conditioner 330 may recognize the Jeolla-do dialect and may then generate a response message for a user as the Jeolla-do dialect.

That is, the air conditioner 330 recognizes that a user in Jeolla-do region wants "air conditioner operation" and reads dialect information on a message that an air conditioner operation is performed from the memory unit 560 to provide it to a user. For example, the display unit 570 may output a message using the Jeolla-do dialect, for example, "it is very hot and turn on quickly (in the Jeolla-do dialect)". In addition, a voice message may be outputted through the voice output unit 580.

By such a configuration, the dialect that a user speaks is recognized and information to be provided to a user is provided as a dialect on the basis of the recognized dialect information, so that the user may feel the intimacy.

FIGS. 16A and 16B are views illustrating a security setting for voice recognition function performance according to a fifth embodiment of the present invention.

Referring to FIGS. 16A and 16B, a user's security setting is possible in the voice recognition system according to the fifth embodiment of the present invention. The security setting may be completed by a smart home appliance directly or by using a mobile device. Hereinafter, for example, security setting and authentication procedures by using a mobile device are described.

When a user wants to use the region customized information providing service, an input may be provided when the mode setting unit 565 in the mobile device 400 is in ON state. As an input is provided when the mode setting unit 565 is in ON state, an operation for setting an initial security may be performed.

The mobile device 400 may output a message for a predetermined key word. For example, as shown in the drawing, a key word "calendar" may be outputted as a text through a screen of the mobile device 400 or may be outputted as voice through a speaker.

Then, together with a message for the outputted key word, a first guide message may be outputted. The first guide message includes contents for an input of a reply word to the key word. For example, the first guide message may include content "please speak word coming to mind when looking at the next word". Then, the first guide message may be outputted as a text through a screen of the mobile device 400 or may be outputted as a voice through a speaker.

For the first guide message, a user may input a word to be set as a password as a voice. For example, as shown in the drawing, a relay word "cat" may be inputted. When the mobile device 400 recognizes the reply word, a second guide message notifying the reply word is stored may be outputted through a screen or a voice.

In such way, when the region customized information providing service is used after the completion of the security setting, as shown in FIG. 16B, a procedure for performing an authentication by inputting a reply word to the key word may be performed.

In more detail, when an input is provided as the mode setting unit 565 in the mobile device 400 is in ON state, the mobile device 400 outputs a message for the key word, for example, "calendar", and outputs a third guide message notifying the need for authentication, for example, "user authentication is required for this function". The message for keyword and the third guide message may be outputted through a screen of the mobile device 400 or a voice.

For the key word, a user may input a predetermined set reply word, for example, a voice of "cat". As recognizing the matching of the key word and the reply word, the mobile device 400 may output a fourth guide message notifying that authentication is successful, for example, a text of voice message "authenticated".

In such a way, after the security is set to use the region customized information providing service, a predetermined reply word is configured to be inputted in a usage stage, so that other users' service access and usage are limited except for designated users.

FIG. 17 is a view illustrating a configuration of a voice recognition system and its operation method according to a sixth embodiment of the present invention.

Referring to FIG. 17, a smart home appliance according to the sixth embodiment of the present invention includes a voice input unit 510 receiving a user's voice input and a voice recognition unit 520 extracting a language element as a text from voice information collected through the voice input unit 510. The voice recognition unit 520 may include a memory unit where the frequency of a voice and a text are mapped.

The smart home appliance may further include an emotion recognition unit 540 extracting user's emotion information from the voice information inputted through the voice input unit 510. The emotion recognition unit 540 may include a database where information on user's voice characteristics and information on an emotion state are mapped. The information on user's voice characteristics may include information on speech spectrum having distinctive characteristics for each user's emotion.

The speech spectrum represents a distribution according to a voice's frequency and may be understood as that a frequency distribution for each emotion, that is, emotions such as joy, angry, and sadness, is patterned. Accordingly, when a user makes a voice with a predetermined emotion, the emotion recognition unit 540 interprets a frequency change to extract a user's emotion.

The text extracted through the voice recognition unit 520 and the information on an emotion determined through the emotion recognition unit 540 may be delivered to the control unit 550. The smart home appliance may further include a memory unit 560 mapping the text extracted by the voice recognition unit 520 and a function corresponding to the text and storing them.

The control unit 550 may recognize a function corresponding to the text extracted by the voice recognition unit 520 on the basis of the information stored in the memory unit 560. Then, the control unit 550 may control a driving unit 590 equipped in the home appliance in order to perform the recognized function.

The home appliance further includes a display unit 570 outputting or providing user customized information to a screen or a voice output unit 580 outputting a voice on the basis of a setting function corresponding to the text extracted by the voice recognition unit 520 and the emotion information extracted by the region recognition unit 540.

That is, the setting function may include a plurality of functions divided according to user's emotions and one function matching the emotion information determined by the emotion recognition unit 540 among the plurality of functions may be outputted. In summary, the display unit 570 or the voice output unit 580 may output combined information of a function corresponding to the text and user's emotion information (user customized information providing service).

Moreover, the smart home appliance further includes a selection available mode setting unit 565 to perform a mode for the user customized information providing service. A user may use the user customized information providing service when the mode setting unit 565 is in "ON" state. Of course, a user may not use the user customized information providing service when the mode setting unit 565 is in "OFF" state.

FIGS. 18 to 20 are views illustrating a message output of a display unit according to a sixth embodiment of the present invention. A display unit 570 shown in FIGS. 18 to 20 may be equipped in the air conditioner 330 or the mobile device 450. Hereinafter, the display unit 570 equipped at the air conditioner 330 is described for an example.

First, referring to FIG. 18, when a user customized information providing service is used by using the air conditioner 330 to condition the air in an indoor space, a user may provide an input when the mode setting unit 565 is in ON state.

When the user customized information providing service starts, for example, a guide message such as "what can I help you", that is, a voice input request message, may be displayed on a screen of the display unit 570. Of course, the voice input request message may be outputted as a voice through the voice output unit 580.

As shown in FIG. 18, a user may input a specific operation command for the voice input request message, for example, as shown in FIG. 18, a voice "air conditioner start". The air conditioner 330 receives and recognizes a user's voice command and extracts a text (first voice information) corresponding to the recognized voice command. Accordingly, the display unit 570 may display a screen "air conditioner start".

Then, the air conditioner 330 may extract emotion information (second voice information) from a voice inputted from a user by operating the emotion recognition unit 540. In more detail, information on a frequency change detected from a user's voice may be compared to information on a speech spectrum having characteristics for people's each emotion. Then, information corresponding to each other may be matched based on a comparison result and accordingly, emotion information that a user's voice has may be obtained.

For example, when a user inputs "air conditioner start" with an angry voice, the emotion recognition unit 540 may recognize that a user makes a voice with an angry emotion from a frequency change detected from the user's voice. The air conditioner 330 combines the first voice information and the second voice information to recognize a function that a user wants and recommend a predetermined function matching a user's emotion, that is, a specific operation mode.

That is, as shown in FIG. 18, as an operation of the air conditioner 330 starts according to a user's command, an operation mode is recommended in consideration of an emotion annoyed with hot weather. For example, the display unit 570 may output a message "oh! very hot? air conditioner start with lowest temperature and direct wind?"

Herein, the direct wind is understood as a mode in which the discharge direction of air is formed directly toward the position of a user detected through the body detection unit 36 of the air conditioner 330. That is, a setting temperature is set to the lowest temperature to perform an air conditioning function and cool wind reaches a user directly, so that a user may feed cool instantly. When a voice that a user accepts or selects the outputted message, for example, "yes", is inputted, the air conditioner 330 recognizes this and operates in the recommended mode.

It is described with reference to FIG. 18 that after the air conditioner 330 recommends a specific mode to a user and a user's recommendation mode acceptance is recognized, the air conditioner 330 operates according to the specific mode. However, unlike this, the recommended mode may operate instantly.

Then, referring to FIG. 19, when a user customized information providing service starts and a voice input request message is outputted to a screen of the display unit 570 or as a voice, a user may input a specific command for the voice input request message, for example, a voice "temperature up"

The air conditioner 330 receives and recognizes a user's voice command and extracts a text (first voice information) corresponding to the recognized voice command. Accordingly, the display unit 570 may display a screen "temperature up".

Then, the air conditioner 300 may extract emotion information (second voice information) from a voice inputted from a user by operating the emotion recognition unit 540. For example, when a user inputs "temperature up" with a trembling voice, the emotion recognition unit 540 may recognize that a user makes a voice with a trembling voice due to cold from a frequency change detected from the user's voice.

The air conditioner 330 combines the first voice information and the second voice information to recognize a function that a user wants and recommend a predetermined function matching a user's emotion, that is, a specific operation mode. That is, as shown in FIG. 19, as an operation of the air conditioner 330 starts according to a user's command, an operation mode is recommended in consideration of a cold trembling state. For example, the display unit 570 may output a message "cold? set air conditioner temperature to 26 degrees. execute action detection indirect wind?".

Herein, the indirect wind is understood as a mode in which the discharge direction of air is indirectly provided toward a user by avoiding the position of the user detected through the body detection unit 36 (see FIG. 2) of the air conditioner 300. That is, a setting temperature rises to a relatively high temperature to perform a cooling or heating function and wind reaches a user indirectly, so that the user may feel pleasant without cold. When a voice that a user accepts the outputted message, for example, "yes", is inputted, the air conditioner 330 recognizes this and operates in the recommended mode.

Then, referring to FIG. 20, when a user customized information providing service starts and a voice input request message is outputted to a screen of the display unit 570 or as a voice, a user may input a specific command for the voice input request message, for example, a voice "air conditioner start"

The air conditioner 330 receives and recognizes a user's voice command and extracts a text (first voice information) corresponding to the recognized voice command. Accordingly, the display unit 570 may display a screen "air conditioner start".

Then, the air conditioner 330 may extract emotion information (second voice information) from a voice inputted from a user by operating the emotion recognition unit 540. For example, when a user input "air conditioner start" with a sad voice, the emotion recognition unit 540 may recognize that a user makes a voice with a sad emotion from a frequency change detected from the user's voice.

The air conditioner 330 combines the first voice information and the second voice information to recognize a function that a user wants and recommend a predetermined function matching a user's emotion, that is, a specific operation mode. That is, as shown in FIG. 20, as an operation of the air conditioner 330 starts according to a user's command, an operation mode is recommended in consideration of a user's sad emotion state. For example, the display unit 570 may output a message "air conditioner start. sir, use aroma function for refresh. start aroma function?".

Herein, the aroma function is understood as a function through which a capsule inserted into the capsule injection device 60 (see FIG. 2) of the air conditioner 300 acts so that a wind with an aroma fragrance is discharged. That is, the air conditioner 300 recognizes a user's sad emotion and then diffuses an aroma fragrance for refresh into an indoor space. When a voice that a user accepts the outputted message, for example, "yes", is inputted, the air conditioner 300 recognizes this and operates in the recommended mode.

FIGS. 21A to 23 are views illustrating a message output of a display unit according to another embodiment of the present invention. A display unit 570 shown in FIGS. 21A to 23 may be equipped in the cooker 320, the refrigerator 340, or the mobile device 400. Hereinafter, the display unit 570 equipped at the refrigerator 340 is described for an example.

First, referring to FIG. 21A, when a user customized information providing service starts and a voice input request message is outputted to a screen of the display unit 570 or as a voice, a user may input a specific command for the voice input request message, for example, a voice "recipe search"

The refrigerator 340 receives and recognizes a user's voice command and extracts a text (first voice information) corresponding to the recognized voice command. Accordingly, the display unit 570 may display a screen "recipe search". Then, the refrigerator 340 may extract emotion information (second voice information) from a voice inputted from a user by operating the emotion recognition unit 540.

For example, when a user inputs "recipe search" with a sad voice, the emotion recognition unit 540 may recognize that a user makes a voice with a sad emotion from a frequency change detected from the user's voice.

The refrigerator 340 combines the first voice information and the second voice information to recognize a function that a user wants and recommend a predetermined function matching a user's emotion, that is, a specific recipe. That is, as shown in FIG. 21A, as a recipe is searched according to a user's command, one of a plurality of recipes is recommended in consideration of a sad emotion. For example, the display unit 570 may output a message "feel depressed? eat sweet food then you feel better. sweet food recipe search?" When a user inputs the acceptance voice for the outputted message, for example, "yes", the refrigerator 340 recognizes this and recommends a specific recipe while outputting a message "sweet food recipe search".

FIG. 21B is similar to FIG. 21A in terms of scenario but when a user rejects a specific recipe that the refrigerator 340 recommends, for example, when a user inputs a voice rejecting a message "sweet food recipe search?" outputted by the display unit 570, that is, "no", a voice input request message "speak food ingredients to search" may be outputted.

As shown in FIG. 21B, a voice input request message "what can I help you?" may be defined as "first message" and a voice input request message "tell food ingredients to search" may be defined as "second message". A user may input a voice for another selectable function with respect to the second message, that is, another food ingredient, to receive information on a desired recipe.

Then, referring to FIG. 22, when a user customized information providing service starts and a voice input request message is outputted to a screen of the display unit 570 or as a voice, a user may input a specific command for the voice input request message, for example, a voice "recipe search"

The refrigerator 340 receives and recognizes a user's voice command and extracts a text (first voice information) corresponding to the recognized voice command. Accordingly, the display unit 570 may display a screen "recipe search".

Then, the refrigerator 340 may extract emotion information (second voice information) from a voice inputted from a user by operating the emotion recognition unit 540. For example, when a user input "recipe search" with an angry voice, the emotion recognition unit 540 may recognize that a user makes a voice with an angry emotion from a frequency change detected from the user's voice.

The refrigerator 340 combines the first voice information and the second voice information to recognize a function that a user wants and recommend a function matching a user's emotion, that is, a specific recipe. That is, as shown in FIG. 22, as a recipe is searched according to a user's command, one of a plurality of recipes is recommended in consideration of an angry emotion. For example, the display unit 570 may output a message "are you angry with empty stomach? fast cook food recipe search?".

When a user inputs the acceptance voice for the outputted message, for example, "yes", the refrigerator 340 recognizes this and recommends a specific recipe while outputting a message "fast cook food recipe search". Of course, in the case of FIG. 22, as described with reference to FIG. 21B, when a user rejects a recommended recipe, the refrigerator 340 may output a second message to receive a desired specific recipe from a user.

Then, referring to FIG. 23, when a user customized information providing service starts and a voice input request message is outputted to a screen of the display unit 570 or as a voice, a user may input a specific command for the voice input request message, for example, a voice "recipe search"

The refrigerator 340 receives and recognizes a user's voice command and extracts a text (first voice information) corresponding to the recognized voice command. Accordingly, the display unit 570 may display a screen "recipe search".

Then, the refrigerator 400 may extract emotion information (second voice information) from a voice inputted from a user by operating the emotion recognition unit 540. For example, when a user inputs "recipe search" with a happy voice, the emotion recognition unit 540 may recognize that a user makes a voice with a happy emotion from a frequency change detected from the user's voice.

The refrigerator 340 combines the first voice information and the second voice information to recognize a function that a user wants and recommend a function matching a user's emotion, that is, a specific recipe. That is, as shown in FIG. 23, as a recipe is searched according to a user's command, one of a plurality of recipes is recommended in consideration of a happy emotion. For example, the display unit 570 may output a message "feel good? make special food. special food recipe search?".

When a user inputs the acceptance voice for the outputted message, for example, "yes", the refrigerator 340 recognizes this and recommends a specific recipe while outputting a message "special food recipe search". Of course, in the case of FIG. 23, as described with reference to FIG. 21B, when a user rejects a recommended recipe, the refrigerator 340 may output a second message to receive a desired specific recipe from a user.

In such a wary, since a smart home appliance extracts emotion information from a user's voice and recommends a specific function matching a user's emotion among a plurality of functions, instead of extracting a text from a user's voice command and performs a set function simply, user's convenience may be increased and product satisfaction may be improved.

FIG. 24 is a block diagram illustrating a configuration of an air conditioner as one example of a smart home appliance according to a seventh embodiment of the present invention. Hereinafter, although an air conditioner is described as one example of a smart appliance, it should be clear in advance that the ideas related to a voice recognition or communication (information offer) procedure except for the unique setting functions of an air conditioner may be applied to other smart home appliances.

Referring to FIG. 24, an air conditioner 600 according to the seventh embodiment of the present invention includes a plurality of communication units 680 and 690 communicating with an external device. The plurality of communication units 680 and 690 include a first communication module 680 communicating with the server 700 and a position information reception unit 690 receiving information on the position of the air conditioner 600 from a position information transmission unit 695.

The first communication module 680 may communicate with the second communication module 780 of the server 780 in a wired or wireless manner. For example, the first communication module 680 of the air conditioner 600 and the second communication module 780 of the server 700 may communicate with each other directly or through an access point, or through a wired network. In this embodiment, there is no limitation in a communication method between the first communication module 680 of the air conditioner 600 and the second communication module 780 of the server 700.

Moreover, each of the first communication module 680 of the air conditioner 600 and the second communication module 780 of the server 700 may have a unique internet protocol (IP) address. Accordingly, when the first communication module 680 and the second communication module 780 are communicably connected to each other, the server 700 may recognize the installed position or region of the air conditioner 600 by recognizing the first communication module 680.

The position information reception unit 680 may be a GPS reception unit, for example. Then, the position information transmission unit 695 is configured to transmit information on the position of the position information reception unit 690 or the air conditioner 600, to the position information reception unit 690. For example, the information on position may include a position coordinate value.

The position information transmission unit 695 may be a GPS satellite or a communication base station. The position information reception unit 690 may transmit a predetermined signal to the position information transmission unit 695 periodically or at a specific time point and the position information transmission unit 695 may transmit the information on position to the position information reception unit 690. In that the first communication module 680 and the position information reception unit 695 recognize the position or region of the air conditioner 600, they may be referred to as a "position information recognition unit".

The server 700 may further include a server memory 770. The server memory 770 may store information necessary for an operation of the air conditioner 600, for example, information on the position (region) of the air conditioner 600 or the first communication module 680 or weather information corresponding to the position (region). When the first communication module 680 and the second communication module 780 are connected communicably, information stored in the server memory 770 may be transmitted to the air conditioner 700.

In such a manner, information on the position of the air conditioner 600 may be recognized based on information on the communication address when the first communication module 680 and the second communication module 780 are connected communicably or information received from the position information reception unit 690.

For example, when the first communication module 680 and the second communication module 780 are not connected communicably, the air conditioner 600 may receive information on the position through the position information reception unit 690. On the other hand, when the position information reception 690 is not in ON state, the air conditioner 600 may receive the information on position through a communication connection of the first and second communication modules 680 and 780.

FIG. 25 is a flowchart illustrating a control method of a smart home appliance according to a seventh embodiment of the present invention.

Referring to FIG. 25, in controlling a smart home appliance according to the seventh embodiment of the present invention, a position recognition service may be set to be turned on. The position recognition service is understood as a service in which the installed position or region of the air conditioner 600 is recognized when the first and second communication modules 680 and 780 are communicably connected or the position information reception unit 690 receives position information and a function of a smart home appliance is performed based on information on the recognized position or region. Then, an application for using the position recognition service is executed in operations S31 and S32.

A user's voice command is inputted through the voice input unit 110 (see FIG. 2). Then, information on the position of the smart home appliance is recognized through the communication connection of the first and second communication modules 680 and 780 and the position information reception unit 690 in operations S33 and S34.

A voice command inputted through the voice input unit 110 may correspond to at least one voice information among a plurality of voice information stored in the memory unit 130 (see FIG. 3) and the corresponding voice information may be extracted as a text. Then, by using the extracted text, a predetermined setting function among a plurality of setting functions that home appliance performs may be recognized in operation S35.

Then, as the smart home appliance performs the recognized setting function, information on the position of the smart home appliance may be considered. Then, information on the setting function and information on the position are combined so that predetermined information may be provided to a user.

For example, when the smart home appliance is located in a region, a language used in a corresponding region, that is, a dialect, may guide information on the setting function. As another example, information for a setting function optimized for the position of the smart home appliance may be guided in operation S36. In relation to this, hereinafter, an example of information on a setting function that a smart home appliance provides is described.

FIG. 26 is a view illustrating a display unit of a smart home appliance. FIG. 26 illustrates a view when information on a setting function combined with position information is outputted.

Referring to FIG. 26, a message for requesting a voice input may be outputted from an output unit 660 of the air conditioner 600. For example, a message "what can I help you?" may be outputted from the output unit 660. At this point, voice and text messages may be outputted together.

For this, a user may speak a voice command "temperature up". The spoken voice is inputted through the voice input unit 110 and filtered and then is delivered to the main control unit 120 (see FIG. 3). The main control unit 120 recognizes the filtered voice as predetermined voice information and outputs it as a text.

Then, through a communication connection with the server 700 or on the basis of information received from the position information reception unit 690, information on the position of the air conditioner 600 may be recognized. The air conditioner 600 may provide a setting function corresponding to the voice command to a user according to the recognized voice command information. At this point information on the recognized position may be considered.

For example, when the position (region) of the air conditioner 600 is in the Gyeongsang-do region, information on the setting function may be guided in Gyeongsang-do accent. For example, a message for performing a function to raise a setting temperature in Gyeongsang-do accent "raise temperature by one degree?" may be outputted. For this, when a user inputs an acceptance intention, that is, a voice "yes", the main control unit 120 may control an operation of the driving unit 140 (see FIG. 3) to raise a setting temperature by 1 degree.

FIG. 27 is a view illustrating a configuration of a cooker as another example of a smart home appliance according to a seventh embodiment of the present invention. FIGS. 28A and 28B are views illustrating a display unit of the cooker.

Referring to FIG. 27, a cooker 810 according to the seventh embodiment of the present invention includes a voice input unit 812 receiving a user's voice input, an input unit 814 manipulated for a user's command input, and an output unit 816 displaying information on an operation state of the cooker 810. The output unit 816 includes a display unit displaying information on a screen and a voice output unit outputting a voice.

The cooker 810 includes the filter unit 115, the memory unit 130, the driving unit 140, the control units 120 and 150, and the first communication module 680, and the position information reception unit 690, all of which are described with reference to FIG. 3. Their detailed descriptions are omitted.

Referring to FIG. 28A, a message for requesting a voice input may be outputted from the output unit 816 of the cooker 810. For example, a message "what can I help you?" may be outputted from the output unit 816. At this point, voice and text messages may be outputted together.

For this, a user may speak a voice command "food recipe". The spoken voice is inputted through the voice input unit 110 and filtered and then is delivered to the main control unit 120. The main control unit 120 recognizes the filtered voice as predetermined voice information and outputs it as a text. Then, through a communication connection with the server 700 or on the basis of information received from the position information reception unit 690, information on the position of the cooker 810 may be recognized.

When the main control unit 120 recognizes a user's voice command, the output unit 816 may output a message for requesting an input of detailed information on a recipe. For example, a message "please input food type" may be outputted as voice or text. A user may input information on a desired food type, that is, a food keyword, through the input unit 815. For example, a user may input a food keyword "grilled food".

Once a user's food keyword input is completed, the cooker 810 may complete a related recipe search and may then output a guide message. For example, a message "recipe search is completed. want to check search result?" may be outputted. For this, when a user inputs an acceptance intention, that is, a voice "yes", a screen may be switched and another screen shown in FIG. 28B may be outputted.

Referring to FIG. 28B, information on the position and setting function information corresponding to the recognized voice command may be combined and predetermined information may be outputted to the output unit 816 of the cooker 810.

In more detail, among recipe information on "grilled food" that a user wants, specialty or traditional food recipes in the position (region) of the cooker 810 may be arranged preferentially and outputted to the output unit 360. For example, a specialty or traditional food recipe for "grilled food", that is, "oven-grilled pork roll with fishery", "assorted grilled seafood", and "assorted grilled mushroom", may be arranged at an upper part of the output unit 816 and may be displayed in a check box. That is, among a plurality of information on a setting function, information optimized for the position recognized by the position information recognition units 680 and 690 may be outputted first to the output unit 816.

Then, general grilled food recipes may be arranged at a lower part of the specialty or traditional food recipe. When a user selects a desired recipe among each arranged recipe, detailed information on a recipe may be checked. In such a way, since information on a setting function of a home appliance is provided on the basis of information on a user's voice command and position information of a home appliance, user's convenience may be increased.

FIG. 29 is a view illustrating a configuration of a washing machine as another example of a smart home appliance according to an eight embodiment of the present invention. FIG. 30 is a flowchart illustrating a control method of a smart home appliance according to the eighth embodiment of the present invention.

Referring to FIG. 29, the smart home appliance according to the eighth embodiment may include a washing machine 820.

The washing machine 820 includes a voice input unit 822 receiving a user's voice input, an input unit 825 manipulated for a user's command input, and an output unit 826 displaying information on an operation state of the washing machine 820. The output unit 826 includes a display unit displaying information on a screen and a voice output unit outputting a voice. The washing machine 820 includes the filter unit 115, the memory unit 130, the driving unit 140, the control units 120 and 150, and the first communication module 680, and the position information reception unit 690. Their detailed descriptions are omitted.

Referring to FIG. 30, in controlling a smart home appliance, a position recognition service may be set to be turned on. The position recognition service is understood as a service in which the installed position or region of the washing machine 820 is recognized when the first and second communication modules 680 and 780 are communicably connected or the position information reception unit 690 receives position information and a function of a smart home appliance is performed based on information on the recognized position or region. Then, an application for using the position recognition service is executed in operations S41 and S42.

A user's voice command is inputted through the voice input unit 110. Then, information on the position of the smart home appliance is recognized through the communication connection of the first and second communication modules 680 and 780 and the position information reception unit 690 in operations S43 and S44. Then, weather information of the position (region) where the washing machine 820 is installed is received from the server 700 in operation S45.

A voice command inputted through the voice input unit 110 may correspond to at least one voice information among a plurality of voice information stored in the memory unit 130 and the corresponding voice information may be extracted as a text. Then, by using the extracted text, a predetermined setting function among a plurality of setting functions that home appliance performs may be recognized in operation S46.

Then, as the smart home appliance performs the recognized setting function, weather information on the installed region of the smart home appliance may be considered. Then, information on the setting function and information on the weather are combined so that recommendation information related to the setting function may be provided to a user. That is, one information among a plurality of information related to the setting function may be recommended.

For example, when a smart home appliance is the washing machine 820 and a voice command is "laundry start", a laundry course may be recommended by recognizing weather information on a region where the washing machine 820 is installed. For example, if rainy or high humidity, strong spin or a drying function may be recommended in operation S47.

As another example, when a smart home appliance is an air conditioner, in the case of a voice command "turn on air conditioner", a driving course may be recommended by recognizing weather information on a region where the air conditioner is installed. For example, a dehumidifying function may be recommended by receiving humidity information. Then, a user sets a bedtime reservation, by receiving a temperature of the nighttime, a recommendation for increasing or decreasing a reservation time.

FIG. 31 is a block diagram illustrating a configuration of a voice recognition system according to a ninth embodiment of the present invention.

Referring to FIG. 31, a voice recognition system according to the ninth embodiment of the present invention includes a mobile device 900 receiving a user's voice input, a plurality of home appliances 810, 820, 830, and 840 operating and controlled based on a voice inputted to the mobile device 900, and a server 950 communicably connecting the mobile device 900 and the plurality of home appliances 810, 820, 830, and 840.

For example, the plurality of smart home appliances 810, 820, 830, and 840 may include a cooker 810, a washing machine 820, a cleaner 830, and an air conditioner 840. The mobile device 900 may include a smartphone, a remote controller, and a tap book.

The mobile device 900 includes a voice input unit 110, a first communication module 918, and a position information reception unit 919. Then, the mobile device 900 further includes an input unit 916 outputting information related to a function performance of the home appliance.

The server 950 may further include a server memory 957 and a second communication module 958. The service memory may store text information mapped into an inputted voice and setting function information corresponding to the text information.

An application connected to the server 950 may be executed in the mobile device 900. Once the application is executed, a voice input mode for user's voice input may be activated in the mobile device 900.

When a user's voice is inputted through the voice input unit 110 of the mobile device 900, the inputted voice is delivered to the server 950 and the server 950 may recognize the inputted voice to transmit a command on a setting function performance to a home appliance corresponding to a voice command. At this point, the server 950 may recognize the position of the mobile device 900 and may then transmit a command on the setting function performance to the home appliance on the basis of information on the recognized position.

Then, the server 950 may transmit the information on the setting function performance to the mobile device 900 and the information may be outputted to the output unit 916 of the mobile device 900. In more detail, information on voice recognition, position recognition, and setting function performance may be outputted to the output unit 916 of the mobile device 900. That is, information described with reference to FIGS. 26, 28A and 28B may be outputted to the output unit 916.

In such a way, since a user inputs a voice command or a manipulation through the mobile device 900 and checks information on voice recognition, position recognition, and setting function performance of a home appliance through the output unit 916 of the mobile device 900, user's convenience may be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A smart home appliance comprising:
   a voice input unit collecting a voice of a user, the voice input unit comprising a microphone;
   a voice recognition unit recognizing a text corresponding to the voice collected through the voice input unit;
   a capturing unit collecting an image for detecting a visage of the user, the capturing unit comprising a camera;
   a memory unit mapping the text recognized by the voice recognition unit and a setting function and storing the mapped information, and storing a keyword information that the user may input to start a voice recognition service;
   a control unit determining whether to perform a voice recognition service on the basis of at least one information of image information collected by the capturing unit and voice information collected by the voice input unit;
   a filter unit removing a noise sound from the voice inputted through the voice input unit; and
   a memory unit mapping voice information related to an operation of the smart home appliance and voice information unrelated to an operation of the smart home appliance in the voice inputted through the voice input unit and storing the mapped information;
   wherein the control unit comprises a face detection unit recognizing that the user is in a staring state for voice input when image information on the user's visage is collected for more than a setting time through the capturing unit, and
   wherein the control unit determines that a voice recognition service standby state is entered when it is recognized that there is keyword information in the user's voice collected through the voice input unit and the user is in the staring state through the face detection unit.

2. The smart home appliance according to claim 1, further comprising:
   a region recognition unit determining a region of the user from among a plurality of regions of the user on the basis of information on the user's voice collected through the voice input unit; and
   an output unit outputting region customized information on the basis of information on the region determined by the region recognition unit and information on the setting function.

3. The smart home appliance according to claim 2, wherein the setting function comprises a plurality of functions divided according to the plurality of regions; and
   the region customized information including one function matching the region information determined by the region recognition unit from among the plurality of functions is outputted through the output unit.

4. The smart home appliance according to claim 2, wherein the output unit outputs the region customized information by using a dialect in the region determined by the region recognition unit.

5. The smart home appliance according to claim 2, wherein the output unit outputs a key word for security setting and the voice input unit sets a reply word corresponding to the key word.

6. The smart home appliance according to claim 1, further comprising an emotion recognition unit and an output unit, wherein
   the voice recognition unit recognizes a text corresponding to first voice information in the user's voice collected through the voice input unit;

the emotion recognition unit extracts an emotion of the user on the basis of second voice information in the user's voice collected through the voice input unit; and the output unit outputs user customized information on information on the user's emotion determined by the emotion recognition unit and information on the setting function.

7. The smart home appliance according to claim 6, wherein the first voice information comprises a language element in the user's voice collected through the voice input unit; and the second voice information comprises a non-language element related to the user's emotion.

8. The smart home appliance according to claim 6, wherein the emotion recognition unit comprises a database where information on voice characteristics of the user and information on an emotion state are mapped; and the information on the user's voice characteristics comprises information on a speech spectrum having characteristics for the user's emotion.

9. The smart home appliance according to claim 6, wherein the setting function comprises a plurality of functions to be recommended or selected; and the user customized information including one function matching the emotion information determined by the emotion recognition unit from among the plurality of functions is outputted through the output unit.

10. The smart home appliance according to claim 1, further comprising:

a position information recognition unit recognizing position information; and an output unit outputting information on the setting function on the basis of position information recognized by the position information recognition unit.

11. The smart home appliance according to claim 10, wherein the position information recognition unit comprises:

a GPS reception unit receiving a position coordinate from a position information transmission unit; and a first communication module communicably connected to a second communication module equipped in a server.

12. The smart home appliance according to claim 10, wherein the output unit comprises a voice output unit outputting the information on the setting function as a voice, by using the position information or a dialect.

13. The smart home appliance according to claim 10, wherein the output unit outputs information optimized for a region recognized by the position information recognition unit among a plurality of information on the setting function.

14. The smart home appliance according to claim 10, wherein the position information recognized by the position information recognition unit comprises weather information.

15. An operating method of the smart home appliance according to claim 1, the method comprising:

collecting the user's voice through the voice input unit;

recognizing whether keyword information is included in the collected voice;

collecting image information on the user's visage through the capturing unit; and entering the standby state of the voice recognition service on the basis of the image information on the user's visage.

16. The operating method according to claim 15, further comprising performing a security setting, wherein the performing of the security setting comprises:

outputting a predetermined key word; and inputting a reply word in response to the outputted key word.

17. The method according to claim 15, further comprising:

extracting an emotion state of the user on the basis of information on the user's voice collected through the voice input unit; and recommending an operation mode on the basis of information on the user's emotion state.

18. The method according to claim 15, further comprising:

recognizing an installation position of the smart home appliance through a position information recognition unit; and driving the smart home appliance on the basis of information on the installation position.

19. The method according to claim 18, wherein the recognizing of the installation position of the smart home appliance comprises receiving GPS coordinate information from a GPS satellite or a communication base station.

20. The method according to claim 18, wherein the recognizing of the installation position of the smart home appliance comprises checking a communication address as a first communication module equipped in the smart home appliance is connected to a second communication module equipped in a server.

21. A voice recognition system using a mobile device comprising a voice input unit having a microphone for collecting a voice of a user and a mobile device communication module; and a smart home appliance comprising:

a voice recognition unit recognizing a text corresponding to the voice collected through the voice input unit;

a capturing unit collecting an image for detecting a visage of the user, the capturing unit comprising a camera;

a memory unit mapping the text recognized by the voice recognition unit and a setting function and storing the mapped information, and storing a keyword information that the user may input to start a voice recognition service;

a filter unit removing a noise sound from the voice inputted through the voice input unit; and a memory unit mapping voice information related to an operation of the smart home appliance and voice information unrelated to an operation of the smart home appliance in the voice inputted through the voice input unit and storing the mapped information; and a control unit comprising a face detection unit recognizing that the user is in a staring state for voice input when image information on the user's visage is collected for more than a setting time through the capturing unit; and a smart home appliance communication module, wherein the control unit determines that a voice recognition service standby state is entered when it is recognized that there is keyword information in the user's voice collected through the voice input unit and the user is in the staring state through the face detection unit, wherein the smart home appliance operates based on the user's voice collected through the voice input unit and the respective communication module equipped in each of the mobile device and the smart home appliance, and wherein the mobile device further comprises a movement detection unit determining whether to enter the standby state of the voice recognition service in the smart home appliance by detecting a movement of the mobile device.

22. The voice recognition system according to claim 21, wherein the movement detection unit comprises an acceleration sensor or a gyro sensor detecting a change in an inclined angle of the mobile device, wherein the voice input unit is disposed at a lower part of the mobile device.

23. The voice recognition system according to claim 21, wherein the movement detection unit comprises an illumination sensor detecting an intensity of an external light collected by the mobile device.

* * * * *